(12) United States Patent
Nie et al.

(10) Patent No.: US 11,055,855 B2
(45) Date of Patent: Jul. 6, 2021

(54) METHOD, APPARATUS, DEVICE, AND STORAGE MEDIUM FOR CALCULATING MOTION AMPLITUDE OF OBJECT IN MEDICAL SCANNING

(71) Applicant: SHANGHAI UNITED IMAGING INTELLIGENCE CO., LTD., Shanghai (CN)

(72) Inventors: Jianlong Nie, Shanghai (CN); Zhong Xue, Shanghai (CN)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 91 days.

(21) Appl. No.: 16/596,084

(22) Filed: Oct. 8, 2019

(65) Prior Publication Data

US 2020/0202536 A1 Jun. 25, 2020

(30) Foreign Application Priority Data

Dec. 25, 2018 (CN) .......................... 201811586587.3

(51) Int. Cl.
  *G06T 7/20* (2017.01)
  *G06T 7/80* (2017.01)
  *G06T 7/00* (2017.01)

(52) U.S. Cl.
  CPC .............. *G06T 7/20* (2013.01); *G06T 7/0012* (2013.01); *G06T 7/80* (2017.01); *G06T 2207/20092* (2013.01)

(58) Field of Classification Search
  CPC ........... G06T 7/20; G06T 7/80; G06T 7/0012; G06T 2207/20092; G06T 2207/20104
  See application file for complete search history.

(56) References Cited

U.S. PATENT DOCUMENTS

| 10,576,636 | B1* | 3/2020 | Islam | B25J 9/1692 |
| 2012/0014579 | A1* | 1/2012 | Li | A61B 6/032 |
| | | | | 382/131 |

(Continued)

FOREIGN PATENT DOCUMENTS

| CN | 102107374 A | 6/2011 |
| CN | 102679896 A | 9/2012 |

(Continued)

OTHER PUBLICATIONS

Goddard et al. "Pose Measurement and Tracking System for Motion-Correction of Unrestrained Small Animal PET/SPECT Imaging." IEEE Nuclear Science Symposium, Conference Record, Oct. 19, 2003, pp. 1824-1827 (Year: 2003).*

(Continued)

*Primary Examiner* — Jon Chang

(74) *Attorney, Agent, or Firm* — Faegre Drinker Biddle & Reath

(57) ABSTRACT

Methods and systems for determining a motion amplitude of an object being scanned. For example, a computer-implemented method for determining a motion amplitude of an object being scanned includes determining an internal parameter set based at least in part on calibrating the scanning apparatus according to a first predetermined algorithm; determining an external parameter set based at least in part on a testing surface and the internal parameter set; determining a mapping relationship between a pixel coordinate system and a world coordinate system based at least in part on the determined internal parameter set and the determined external parameter set; determining a motion amplitude of the object in the pixel coordinate system; and determining a motion amplitude of the object in the world coordinate system based at least in part on the determined (Continued)

mapping relationship and the motion amplitude of the object in the pixel coordinate system.

20 Claims, 16 Drawing Sheets

(56) References Cited

U.S. PATENT DOCUMENTS

2016/0247293 A1\* 8/2016 Beylin .................. A61B 6/037
2017/0340287 A1\* 11/2017 Fulton .................. G06T 11/008

FOREIGN PATENT DOCUMENTS

| CN | 105955260 A | 9/2016 |
| CN | 107610199 A | 1/2018 |
| CN | 107818563 A | 3/2018 |

OTHER PUBLICATIONS

Chinese Patent Office, Office Action dated Sep. 8, 2020, in Application No. 201811586587.3.

Chinese Patent Office, Office Action dated Apr. 24, 2020, in Application No. 201811586587.3.

Dongmei et al., "Influence Analysis of Key Equipments for Camera Calibration Accuracy," *Journal of Graphics*, vol. 38, No. 2 (Apr. 2017), pp. 236-240.

\* cited by examiner

METHOD, APPARATUS, DEVICE, AND STORAGE MEDIUM FOR CALCULATING MOTION AMPLITUDE OF OBJECT IN MEDICAL SCANNING

1. CROSS-REFERENCES TO RELATED APPLICATIONS

This application claims priority to Chinese Patent Application No. 201811586587.3, filed Dec. 25, 2018, incorporated by reference herein for all purposes.

2. BACKGROUND OF THE INVENTION

Certain embodiments of the present invention are directed to object measurement. More particularly, some embodiments of the invention provide method, apparatus, computer device, and storage medium for calculating a motion amplitude of an object in medical scanning. Merely by way of example, some embodiments of the invention have been applied to calculating a motion amplitude of a patient. But it would be recognized that the invention has a much broader range of applicability.

With development of technology, wide application of image acquisition devices in various industries has brought great convenience to people's lives. For example, by using a single video camera or camera, sizes of some actual objects can be measured, or a motion amplitude of a patient in medical imaging can be estimated.

Currently, in measuring a size of an actual object (e.g., a physical object in a physical phase) by using a camera or a video camera, generally the size of the object can be measured by using a plurality of cameras or a single camera. In a process of using a plurality of cameras, relative positions of the plurality of cameras may to be fixed, and the relative positions cannot be changed arbitrarily. In a process of using a single camera, the camera may acquire two images of the object for calculation. The two images are generated by motion of the camera or motion of the object, and the calculation is practicable only if a motion distance is known. Similarly, in estimating the motion amplitude of the patient by using a camera or a video camera, it is necessary to acquire an image in an initial location of the patient and an image in a final location of the patient, and then calculate and measure the motion amplitude of the patient based on known camera parameters and optical geometric principles.

However, due to intrinsic designs of the camera and/or an instable production process of the camera, some distortion of the captured image can occur, reducing imaging quality and thus reducing accuracy in calculating the motion amplitude of the object in medical scanning.

3. BRIEF SUMMARY OF THE INVENTION

Certain embodiments of the present invention are directed to object measurement. More particularly, some embodiments of the invention provide method, apparatus, computer device, and storage medium for calculating a motion amplitude of an object in medical scanning. Merely by way of example, some embodiments of the invention have been applied to calculating a motion amplitude of a patient. But it would be recognized that the invention has a much broader range of applicability.

In various embodiments, a computer-implemented method for determining a motion amplitude of an object being scanned using a scanning apparatus includes: determining an internal parameter set based at least in part on calibrating the scanning apparatus according to a first predetermined algorithm; determining an external parameter set based at least in part on a testing surface and the internal parameter set; determining a mapping relationship between a pixel coordinate system and a world coordinate system based at least in part on the determined internal parameter set and the determined external parameter set; determining a motion amplitude of the object in the pixel coordinate system; and determining a motion amplitude of the object in the world coordinate system based at least in part on the determined mapping relationship and the motion amplitude of the object in the pixel coordinate system. In certain examples, determining an internal parameter set based at least in part on calibrating the scanning apparatus according to a first predetermined algorithm includes: determining a first set of values of the internal parameter set associated with a first plurality of calibration images; determining whether a total number of calibration images of the first plurality of calibration images is greater than a threshold number; and if the total number of calibration images is greater than the threshold number: determining a deviation metric set associated with the first plurality of calibration images, each deviation metric of the deviation metric set associated with one calibration image of the first plurality of calibration images; removing one or more calibration images from the first plurality of calibration images based at least in part on the deviation metric set; generating a second plurality of calibration images, the second plurality of calibration images being parts of the first plurality of calibration images but not including at least one image of the removed one or more calibration images; and determining a second set of values of the internal parameter set associated with the second plurality of calibration images.

In various embodiments, a system for determining a motion amplitude of an object being scanned using a scanning apparatus includes: an internal parameter determining module configured to determine an internal parameter set based at least in part on calibrating the scanning apparatus according to a first predetermined algorithm; an external parameter determining module configured to determine an external parameter set based at least in part on a testing surface and the internal parameter set; a mapping relationship determining module configured to determine a mapping relationship between a pixel coordinate system and a world coordinate system based at least in part on the determined internal parameter set and the determined external parameter set; a pixel motion module configured to determine a motion amplitude of the object in the pixel coordinate system; and a world motion module configured to determine a motion amplitude of the object in the world coordinate system based at least in part on the determined mapping relationship and the motion amplitude of the object in the pixel coordinate system. In certain examples, the internal parameter determining module is further configured to: determine a first set of values of the internal parameter set based at least in part on a first plurality of calibration images; determine whether a total number of calibration images of the first plurality of calibration images is greater than a threshold number; and if the total number of calibration images is greater than the threshold number: determine a deviation metric set associated with the first plurality of calibration images, each deviation metric of the deviation metric set associated with one calibration image of the first plurality of calibration images; remove one or more calibration images from the first plurality of calibration images based at least in part on the deviation metric set; generate a second plurality of calibration images, the second plurality of calibration images being parts of the first plurality of images but not including at least one image of the one or more removed calibration images; and determine a second set of values of the internal parameter set associated with the second plurality of calibration images.

In various embodiments, a non-transitory computer-readable medium with instructions stored thereon, that when executed by a processor, perform the processes including: determining an internal parameter set based at least in part on calibrating the scanning apparatus according to a first predetermined algorithm; determining an external parameter set based at least in part on a testing surface and the internal parameter set; determining a mapping relationship between a pixel coordinate system and a world coordinate system based at least in part on the determined internal parameter set and the determined external parameter set; determining a motion amplitude of the object in the pixel coordinate system; and determining a motion amplitude of the object in the world coordinate system based at least in part on the determined mapping relationship and the motion amplitude of the object in the pixel coordinate system. In certain examples, the non-transitory computer-readable medium with instructions stored thereon, that when executed by a processor, further perform the processes including: determining a first set of values of the internal parameter set associated with a first plurality of calibration images; determining whether a total number of calibration images of the first plurality of calibration images is greater than a threshold number; and if the total number of calibration images is greater than the threshold number: determining a deviation metric set associated with the first plurality of calibration images, each deviation metric of the deviation metric set associated with one calibration image of the first plurality of calibration images; removing one or more calibration images from the first plurality of calibration images based at least in part on the deviation metric set; generating a second plurality of calibration images, the second plurality of calibration images being parts of the first plurality of calibration images but not including at least one image of the removed one or more calibration images; and determining a second set of values of the internal parameter set associated with the second plurality of calibration images.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Figure 1:
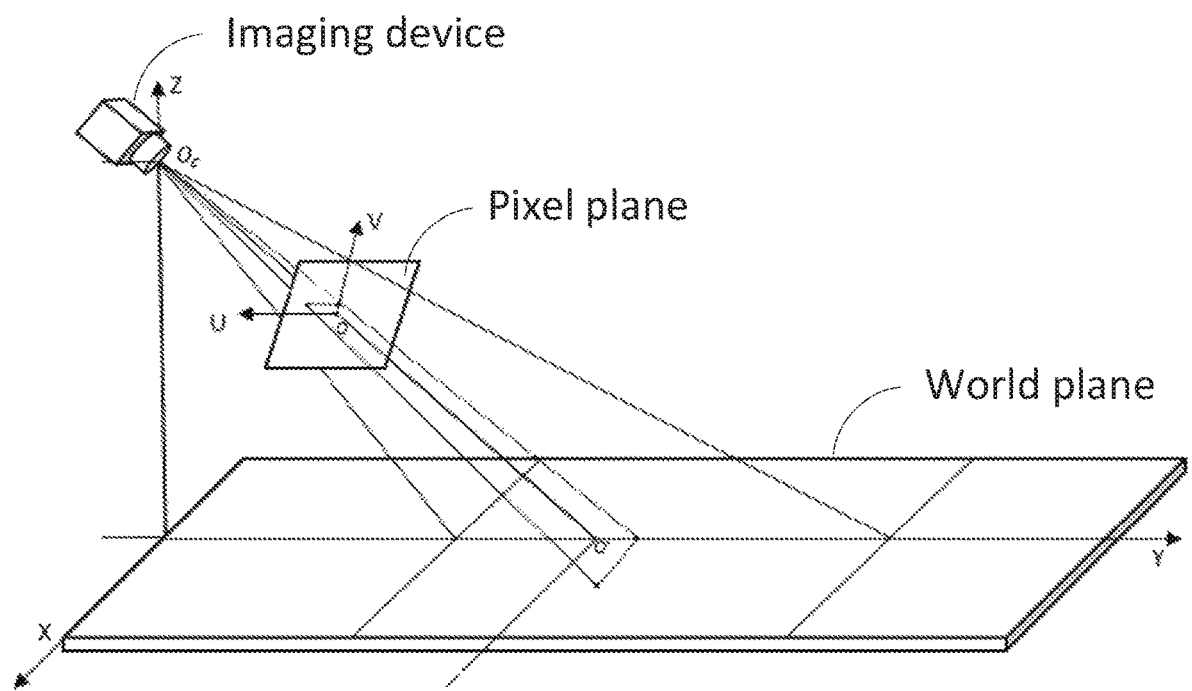
FIG. 1 is a simplified diagram showing an application environment of a method for calculating a motion amplitude of an object in medical scanning according to an embodiment.

Certain embodiments of the present invention are directed to object measurement. More particularly, some embodiments of the invention provide method, apparatus, computer device, and storage medium for calculating a motion amplitude of an object in medical scanning. Merely by way of example, some embodiments of the invention have been applied to calculating a motion amplitude of a patient. But it would be recognized that the invention has a much broader range of applicability.

In some embodiments, provided is method, apparatus, device, and/or storage medium for calculating a motion amplitude of an object in medical scanning. For example, a computer device first determines an intrinsic parameter and an extrinsic parameter of a imaging device, and then determines a mapping relationship between a pixel coordinate system and a world coordinate system based on the intrinsic parameter and the extrinsic parameter, and finally determines a motion amplitude of a region of interest of the object in the world coordinate system based on the mapping relationship and a motion amplitude of the region of interest of the object in the pixel coordinate system. In this way, calibration images are filtered first, thereby improving calibration precision of the imaging device, enhancing imaging quality of the imaging device, and improving precision of calculating the motion amplitude of the region of interest of the object.

In some examples, provided is a method, apparatus, computer device, and/or storage medium for calculating a motion amplitude of an object in medical scanning, to reduce distortion of a captured image, improve imaging quality, and improve accuracy in calculating the motion amplitude of the object in medical scanning.

According to some embodiments, a method for calculating a motion amplitude of an object in medical scanning includes: calibrating a imaging device based on a first predetermined algorithm, and obtaining an intrinsic parameter of the imaging device; determining an extrinsic parameter of the imaging device based on a to-be-measured plane and the intrinsic parameter of the imaging device; determining a mapping relationship between a pixel coordinate system and a world coordinate system based on the intrinsic parameter and the extrinsic parameter; and determining a motion amplitude of a region of interest of the object in the world coordinate system based on the mapping relationship and a motion amplitude of the region of interest of the object in the pixel coordinate system.

In an embodiment, the calibrating an imaging device based on a first predetermined algorithm and obtaining an intrinsic parameter of the imaging device includes: selecting a plurality of qualified calibration images; and determining the intrinsic parameter of the imaging device based on the qualified calibration image.

In an embodiment, the selecting a qualified calibration image: calculating an deviation between a first calibration point and a second calibration point of each calibration image, where the first calibration point is a coordinate corresponding to an initial calibration point of each calibration image, the second calibration point is a coordinate corresponding to the calibration point obtained after each calibration image is remapped based on an imaging model of the imaging device, and the imaging model of the imaging device is an imaging model of the imaging device that is calculated based on each calibration image by using the extrinsic parameter and the intrinsic parameter; comparing the deviation between the first calibration point and the second calibration point of each calibration image with an deviation threshold to obtain a comparison result; and determining the qualified calibration image based on the comparison result.

In an embodiment, the determining the qualified calibration image based on the comparison result includes: determining, if the comparison result is that the deviation is less than or equal to the deviation threshold, that the calibration image is a qualified calibration image; or determining, if the comparison result is that the deviation is greater than the deviation threshold, that the calibration image is an unqualified calibration image.

In an embodiment, before the determining the qualified calibration image based on the comparison result, the method includes: determining whether a total quantity of calibration images is less than or equal to a predetermined quantity threshold; and determining, if the total quantity of calibration images is less than or equal to the predetermined quantity threshold, that all the calibration images are qualified calibration images; or determining the qualified calibration image based on the comparison result if the total quantity of calibration images is greater than the predetermined quantity threshold.

In an embodiment, before the determining an extrinsic parameter of the imaging device based on a to-be-measured plane and the intrinsic parameter of the imaging device, the method includes: creating a datum plane library, where the datum plane library includes at least one calibrated to-be-measured plane.

In an embodiment, before the determining a motion amplitude of a region of interest of the object in the world coordinate system based on the mapping relationship and a motion amplitude of the region of interest of the object in the pixel coordinate system, the method further includes: determining a first coordinate and a second coordinate of the region of interest of the object in the pixel coordinate system by using a second predetermined algorithm, where the first coordinate is an initial coordinate of the region of interest of the object, and the second coordinate is a final coordinate of the region of interest of the object; and determining the motion amplitude of the region of interest of the object in the pixel coordinate system based on the first coordinate and the second coordinate of the region of interest of the object in the pixel coordinate system.

According to various embodiments, an apparatus for calculating a motion amplitude of an object in medical scanning includes: an intrinsic parameter obtaining module configured to calibrate an imaging device based on a predetermined algorithm, and obtain an intrinsic parameter of the imaging device; an extrinsic parameter determining module configured to determine an extrinsic parameter of the imaging device based on a to-be-measured plane and the intrinsic parameter of the imaging device; a mapping relationship determining module configured to determine a mapping relationship between a pixel coordinate system and a world coordinate system based on the intrinsic parameter and the extrinsic parameter; and a first motion amplitude determining module configured to determine a motion amplitude of a region of interest of the object in the world coordinate system based on the mapping relationship and a motion amplitude of the region of interest of the object in the pixel coordinate system.

According to various embodiments a computer device includes a memory and a processor, the memory stores a computer program that when executed, the processor implements the processes including: calibrating an imaging device based on a first predetermined algorithm, and obtaining an intrinsic parameter of the imaging device; determining an extrinsic parameter of the imaging device based on a to-be-measured plane and the intrinsic parameter of the imaging device; determining a mapping relationship between a pixel coordinate system and a world coordinate system based on the intrinsic parameter and the extrinsic parameter; and determining a motion amplitude of a region of interest of the object in the world coordinate system based on the mapping relationship and a motion amplitude of the region of interest of the object in the pixel coordinate system.

According to various embodiments, a computer-readable storage medium, on which a computer program is stored that when executed by a processor, implements the processes including: calibrating an imaging device based on a first predetermined algorithm, and obtaining an intrinsic parameter of the imaging device; determining an extrinsic parameter of the imaging device based on a to-be-measured plane and the intrinsic parameter of the imaging device; determining a mapping relationship between a pixel coordinate system and a world coordinate system based on the intrinsic parameter and the extrinsic parameter; and determining a motion amplitude of a region of interest of the object in the world coordinate system based on the mapping relationship and a motion amplitude of the region of interest of the object in the pixel coordinate system.

According to certain embodiments, a method, an apparatus, a device, and/or a storage medium for calculating a motion amplitude of an object in medical scanning, first determines an intrinsic parameter and an extrinsic parameter of an imaging device, then determines a mapping relationship between a pixel coordinate system and a world coordinate system by using the intrinsic parameter and the extrinsic parameter, and finally determines the motion amplitude of the region of interest of the object in the world coordinate system based on the mapping relationship and the motion amplitude of the region of interest of the object in the pixel coordinate system. In some examples, calibrating the imaging device helps improve the calibration precision of the camera, increase the imaging quality of the imaging device, and therefore, improving the precision of calculating the motion amplitude of the region of interest of the object.

To make the objectives, technical solutions, and advantages of the embodiments of this application clearer, the following further describes the embodiments of this application in detail with reference to accompanying drawings and embodiments. It should be understood that the specific embodiments described herein are merely used to explain this application but are not intended to limit this application.

FIG. 1 is a simplified diagram showing an application environment, according to some embodiments of the present invention. This diagram is merely an example, which should not unduly limit the scope of the claims. One of ordinary skill in the art would recognize many variations, alternatives, and modifications. Although the above has been shown using a selected group of components, there can be many alternatives, modifications, and variations. For example, some of the components may be expanded and/or combined. Other components may be inserted to those noted above. Depending upon the embodiment, the arrangement of components may be interchanged with others replaced.

A method for calculating a motion amplitude of an object in medical scanning according to an embodiment of this application is applicable to an application environment shown in FIG. 1. The application environment includes a computer device, an imaging device, a pixel plane, and a world plane. In some examples, the computer device is a server, and the computer device includes a processor, a memory, a network interface, and a database that are connected through a system bus. In certain examples, the processor of the computer device is configured to provide computing and control capabilities. In certain examples, the memory of the computer device includes a non-volatile storage medium, and an internal memory. In certain examples, the non-volatile storage medium stores an operating system, a computer program, and a database. In certain examples, the internal memory provides an environment for operation of an operating system and a computer program in the non-volatile storage medium. In certain examples, the database of the computer device is used to store data of the method for calculating a motion amplitude of an object in medical scanning. In certain examples, the network interface of the computer device is configured to communicate with other external devices through a network connection. In various examples, when executed by the processor, the computer program implements the method for calculating a motion amplitude of an object in medical scanning. In some examples, the imaging device is a camera, a video camera, or the like. In some examples, the pixel plane is an imaging plane of images of the object and/or the world plane is a plane on which the actual object is placed.

The method, apparatus, device, and storage medium for calculating a motion amplitude of an object in medical scanning according to various embodiments reduce distortion of the captured image, improve final imaging quality and then improve accuracy in calculating the motion amplitude of the object in medical scanning. With reference to embodiments and accompanying drawings, the following will describe in detail the technical solution of the embodiments of this application. The following specific embodiments may be combined with each other, and repeated description of the same or similar concepts or processes may be avoided in some embodiments. It should be noted that the apparatus for calculating a motion amplitude of an object in medical scanning according to an embodiment of the present invention may be implemented in the form of software, hardware or a combination of software and hardware and become a part or whole of a data analysis terminal.

To make the objectives, technical solutions, and advantages of the embodiments of the present invention clearer, the following clearly and completely describes the technical solution in the embodiments of the present invention with reference to the accompanying drawings in the embodiments of the present invention. The described embodiments are some but not all of the embodiments of the present invention.

FIGS. 2-7 are simplified diagrams showing one or more methods for calculating a motion amplitude of an object in medical scanning, according to some embodiments of the present invention. The diagrams are merely examples, which should not unduly limit the scope of the claims. One of ordinary skill in the art would recognize many variations, alternatives, and modifications. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

Figure 2:
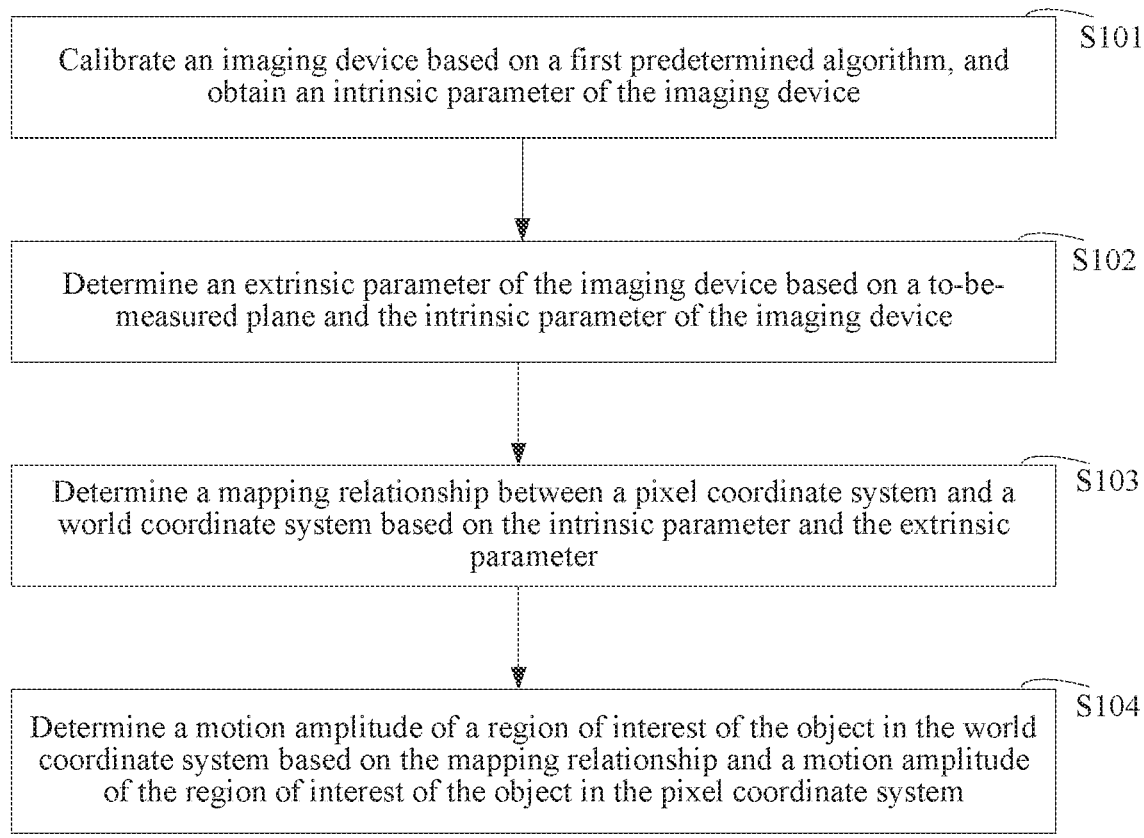
FIG. 2 is a simplified schematic flowchart showing a method for calculating a motion amplitude of an object in medical scanning according to an embodiment.

FIG. 2 shows a method for calculating a motion amplitude of an object in medical scanning, according to some embodiments. In some examples, the method is implemented by a computer device for calculating a mapping relationship between a pixel coordinate system and a world coordinate system based on an intrinsic parameter and an extrinsic parameter of an imaging device and calculating a motion amplitude of the object in the world coordinate system with reference to a motion amplitude of the object on a pixel plane. In various examples, the method includes the following steps:

S101: Calibrate an imaging device based on a first predetermined algorithm and obtain an intrinsic parameter of the imaging device.

In some examples, the first predetermined algorithm is a Zhang Zhengyou calibration algorithm, or an eight-point algorithm. In certain examples, an intrinsic parameter of a camera includes a focal length, a principal point, a tilt coefficient, and/or a distortion coefficient. In some examples, the imaging device is a device having an image acquisition function. For example, the imaging device is a camera or a video camera. In certain examples, the first predetermined algorithm is the Zhang Zhengyou calibration algorithm, and the imaging device is a camera. In some examples, a computer device is configured to calibrate a camera based on the Zhang Zhengyou calibration algorithm. As an example, calibrating a camera includes calculating the intrinsic parameters of the camera based on a prepared calibration plate and a feature point in one or more images captured in different locations and/or in different directions.

S102: Determine an extrinsic parameter of the imaging device based on a to-be-measured plane and the intrinsic parameter of the imaging device.

In some examples, the to-be-measured plane is a plane on which the calibration plate is disposed. In certain examples, the computer device is configured to determine the extrinsic parameter of the imaging device based on the to-be-measured plane. In various examples, the extrinsic parameter of the imaging device is or includes a rotation-translation matrix. In certain examples, the rotation-translation matrix includes rotational elements and/or translational elements, such as from a first coordinate system to a second coordinate system. In some examples, the value of the extrinsic parameter of the imaging device corresponds to a selected calibrated plane in a one-to-one manner. For example, each different calibrated plane corresponds to a different value of the extrinsic parameter of the imaging device. In various examples, the intrinsic parameter of the imaging device remains unchanged. For example, the value of the intrinsic parameter of the imaging device is independent from the selection of a calibrated plane. In some embodiments, in step S101, with reference to the intrinsic parameter of the imaging device, a computer device is configured to calculate the extrinsic parameter of the imaging device based on a calibrated to-be-measured plane. In various examples, determining the extrinsic parameter of the imaging device (e.g., by the computer device) is similar or identical to the process of determining the intrinsic parameter, such as calculating based on the Zhang Zhengyou calibration algorithm or the eight-point algorithm.

S103: Determine a mapping relationship between a pixel coordinate system and a world coordinate system based on the intrinsic parameter and the extrinsic parameter.

In various examples, the computer device is configured to determine a mapping relationship between the pixel coordinate system and the world coordinate system based on the extrinsic parameter and the intrinsic parameter of the imaging device that are calculated in steps S101 and S102 above. In some examples, the pixel coordinate system is a coordinate system that is established by using an upper left corner of an image of an object as an origin and using a pixel as a unit. In some examples, the world coordinate system is an actual physical coordinate system that uses a point in the world as an origin. In certain examples, a calculation (e.g., determined by the computer device) of the mapping relationship includes performing an inverse operation on the following formula (1) to obtain formula (2), which represents the mapping relationship between the pixel coordinate system and the world coordinate system.

$$\begin{bmatrix} u \\ v \\ 1 \end{bmatrix} = \begin{bmatrix} \alpha_x & \delta & u_0 & 0 \\ \beta & \alpha_y & v_0 & 0 \\ \gamma & \varpi & 1 & 1 \end{bmatrix} \begin{bmatrix} R & T \\ 0 & 1 \end{bmatrix} \begin{bmatrix} x_w \\ y_w \\ z_w \\ 1 \end{bmatrix} \quad (1)$$

$$= M_1 M_2 X$$

$$X = (M_1 M_2)^{-1} \begin{bmatrix} u \\ v \\ 1 \end{bmatrix} \quad (2)$$

In the formula (1) above, $[x_w\ y_w\ z_w\ 1]^T$ is a coordinate of the object in the world coordinate system, $[u\ v\ 1]^T$ is a coordinate of the object in the pixel coordinate system, $M_1$ is an intrinsic parameter of the imaging device, $M_2$ is an extrinsic parameter of the imaging device, and $X$ is an overall expression of $[x_w\ y_w\ z_w\ 1]^T$.

S104: Determine a motion amplitude of a region of interest of the object in the world coordinate system based on the mapping relationship and a motion amplitude of the region of interest of the object in the pixel coordinate system.

In various examples, the computer device is configured to determine the motion amplitude of the region of interest of the object in the world coordinate system with reference to the motion amplitude of the region of interest of the object in the pixel coordinate system based on the mapping relationship, determined in step S103 above, between the pixel coordinate system and the world coordinate system. In some examples, the motion amplitude of the region of interest of the object in the pixel coordinate system denotes a distance between a start location and an end location of the region of interest of the object in the pixel coordinate system. In certain examples, calculating the motion amplitude of the object includes calculating the motion amplitude of the region of interest of the object in the world coordinate system. In some examples, the region of interest of the object includes multiple regions of interest and/or includes one or more points of interest.

In various embodiments, calculating a motion amplitude of an object in medical scanning according includes determining (e.g., using the computer device) the intrinsic parameter and the extrinsic parameter of the imaging device, determining the mapping relationship between the pixel coordinate system and the world coordinate system by using the intrinsic parameter and the extrinsic parameter, and determining the motion amplitude of the region of interest of the object in the world coordinate system based on the mapping relationship and the motion amplitude of the region of interest of the object in the pixel coordinate system. In certain examples, multiple candidate calibration images are filtered, thereby improving calibration precision of an imaging device, improving imaging quality of the imaging device, and improving the precision of calculating the motion amplitude of the region of interest of the object.

Figure 3:
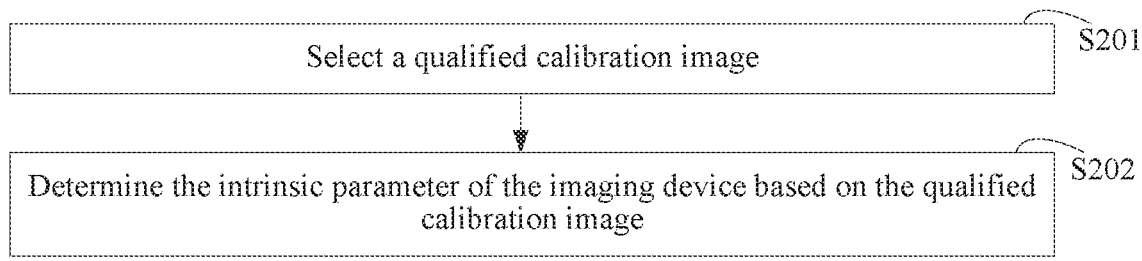
FIG. 3 is a simplified schematic flowchart showing a method for calculating a motion amplitude of an object in medical scanning according to an embodiment.

In an embodiment, FIG. 3 shows a method, such as a step of the method, for calculating a motion amplitude of an object in medical scanning. For example, the method is implemented by the computer device to determine the intrinsic parameter of the imaging device based on a qualified calibration image. In certain examples, the foregoing step S101 includes the following steps:

S201: Select a qualified calibration image.

In various embodiments, a qualified calibration image is a calibration image of high quality, such as a calibration image characterized by uniform illumination and/or normative placement of a calibration plate. In certain examples, the computer device is configured to obtain a qualified calibration image by controlling normative illumination of the calibration image and normative placement of the calibration plate when capturing the calibration image using the imaging device, such as for achieving high quality of the calibration image. In certain examples, one or more unqualified calibration images is screened out, manually or automatically, such as after one or more qualified calibration images are selected from multiple candidate calibration images.

S202: Determine the intrinsic parameter of the imaging device based on the qualified calibration image.

In various embodiments, the computer device is configured to determine the intrinsic parameter of the imaging device based on the qualified calibration image determined in step S201 above. In certain examples, the intrinsic parameter is determined through calculation using the Zhang Zhengyou calibration algorithm or the eight-point algorithm or by other means.

In the method for calculating a motion amplitude of an object in medical scanning according to this embodiment, the computer device obtains a qualified calibration image first, and determines the intrinsic parameter of the imaging device based on the qualified calibration image. In this way, due to relatively high quality of the calibration image, the precision of the determined intrinsic parameter of the imaging device is higher.

Figure 4:
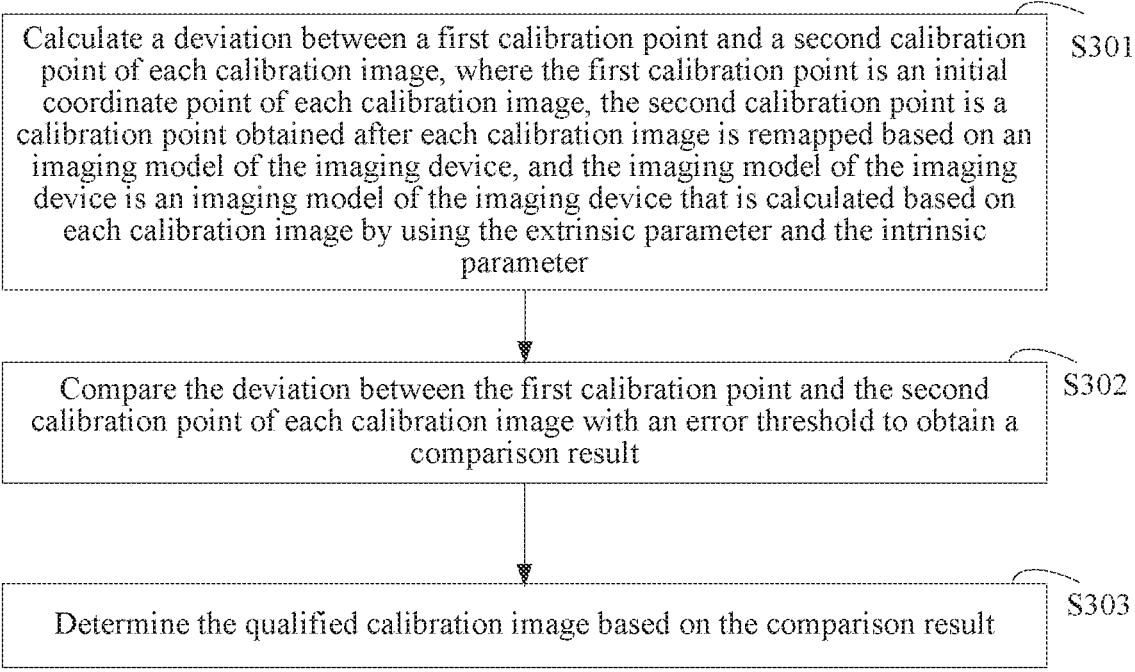
FIG. 4 is a simplified schematic flowchart showing a method for calculating a motion amplitude of an object in medical scanning according to an embodiment.
Figure 5:
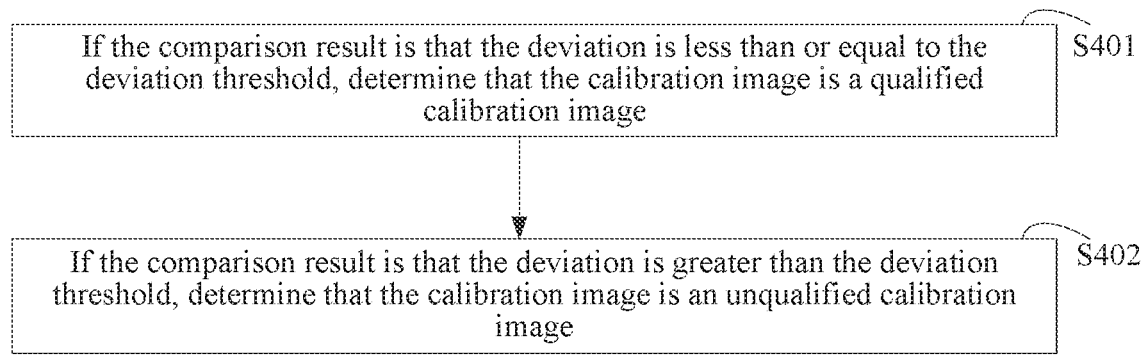
FIG. 5 is a simplified schematic flowchart showing a method for calculating a motion amplitude of an object in medical scanning according to an embodiment.

In an embodiment, FIG. 4 shows a method, such as a step of the method, for calculating a motion amplitude of an object in medical scanning. For example, the computer device is configured to determine or identify a qualified image, such as from multiple candidate calibration images, based on a deviation between a first calibration point and a second calibration point of each calibration image. In certain examples, the computer device is configured to determine or identify a qualified image, such as from multiple candidate calibration images, based on a collective deviation (e.g., a concatenated and/or normalized deviation) between a first group calibration points and a second group of calibration points of each calibration image. In some examples, step S201 above includes the following steps:

S301: Calculate a deviation between a first calibration point and a second calibration point of each calibration image. In some examples, the first calibration point (e.g., a first calibration point of the first group of calibration points) is a coordinate corresponding to an initial calibration point of each calibration image. In some examples, the second calibration point (e.g., a second calibration point of the second group of calibration points) is a coordinate corresponding to a calibration point obtained after each calibration image is remapped based on an imaging model of the imaging device. In certain examples, S301 is repeated to calculate a deviation for each calibration point of the first group of calibration points and its corresponding calibration point of the second group of calibration points. In some examples, S301 includes calculating a collective deviation (e.g., a concatenated and/or normalized deviation) between a first group calibration points and a second group of calibration points of each calibration image. In some examples, the imaging model of the imaging device is obtained through calculation by using the extrinsic parameter and the intrinsic parameter based on each calibration image.

In certain examples, each calibration image is an image captured by, using the imaging device, capturing an object placed on a calibration plate. In some examples, the first calibration point of the calibration image is a coordinate corresponding to an initial coordinate point of each calibration image, and/or the second calibration point of the calibration image is a coordinate corresponding to a calibration point obtained after each calibration image is remapped based on an imaging model of the imaging device, where the imaging model of the imaging device is an imaging model of the imaging device that is calculated based on the intrinsic parameter of the imaging device and the extrinsic parameter of each calibration image.

In certain examples, the computer device is configured to calculate the deviation between the first calibration point and the second calibration point. For example, the first calibration point, represented by A (u, v) and the second calibration point, represented by A'=(u', v'), the deviation is calculated using formula (3):

$$Err = \sum_{i=1}^{N} \|A_i - A_i'\|^2 \quad (3)$$

where Err is the deviation between the first calibration point and the second calibration point, $A_i$ is the first calibration point, $A'_i$ is the second calibration point, and N is the total quantity of calibration points in a calibration image. In certain examples, other formulas may be used instead of equation (3), for example, a cosine formula.

S302: Compare the deviation between the first calibration point (e.g., a first calibration point of the first group of calibration points) and the second calibration point (e.g., a second calibration point of the second group of calibration points) of each calibration image with a deviation threshold to obtain a comparison result.

In various embodiments, based on the deviation, determined by the computer device in step S301, between the first calibration point and the second calibration point of each calibration image, each deviation is compared with a deviation threshold to obtain a comparison result. In various examples, the deviation threshold is predetermined manually or automatically. For example, the value of the deviation threshold is determined based on imaging conditions and/or an imaging protocol. In various embodiments, the obtained comparison result includes: the deviation between the first calibration point and the second calibration point is greater than the deviation threshold, or the deviation between the first calibration point and the second calibration point is less than or equal to the deviation threshold. In certain examples, S302 is repeated to compare each deviation obtained at S301 (e.g., for each calibration point of the first group of calibration points) with the deviation threshold. In some examples, S302 includes comparing the collective deviation (e.g., a concatenated and/or normalized deviation) with the deviation threshold to obtain the comparison result.

S303: Determine the qualified calibration image based on the comparison result.

In various embodiments, the qualified calibration image is determined based on the comparison result obtained, such as by the computer device, in step S302 above.

In certain examples, the step S303 includes the following steps:

S401: If the comparison result is that the deviation is less than or equal to the deviation threshold, determine that the calibration image is a qualified calibration image.

In some embodiments, if the comparison result is that the deviation between the first calibration point and the second calibration point of the calibration image is less than or equal to the deviation threshold, the computer device is configured to determine that the calibration image is a qualified calibration image. For example, the computer device is configured to use formula (4) to represent a newly determined qualified calibration image set.

$$Set_{new} = \{I_i | Err_i < e, I_i \in Set_{old}\} \quad (4)$$

where $Set_{new}$ is a new qualified calibration image set, e is an deviation threshold, $Set_{old}$ is an old calibration image set, and $Err_i$ is an deviation between the first calibration point and the second calibration point on the calibration image $I_i$.

S402: If the comparison result is that the deviation is greater than the deviation threshold, determine that the calibration image is an unqualified calibration image.

In various embodiments, if the comparison result is that the deviation between the first calibration point and the second calibration point of the calibration image is greater than the deviation threshold, the computer device is configured to determine that the calibration image is an unqualified calibration image, and to screen the calibration image out, such as remove the calibration image from a plurality of candidate calibration images.

In some embodiments, a method for calculating a motion amplitude of an object in medical scanning includes comparing (e.g., using the computer device) the deviation between the first calibration point and the second calibration point of each calibration image with the deviation threshold, and based on the comparison result, determining that an image with an deviation greater than the deviation threshold is an unqualified image, and screening out the image; and determining that an image with an deviation less than or equal to the deviation threshold is a qualified image, and forming a new calibration image set. In some examples, the new calibration image set includes the one or more qualified calibration images selected, such as selected by the computer device. In some examples, the qualified calibrated images are determined using a precise mathematical method, such that the imaging device calibrated using such qualified calibration images is of higher precision.

Figure 6:
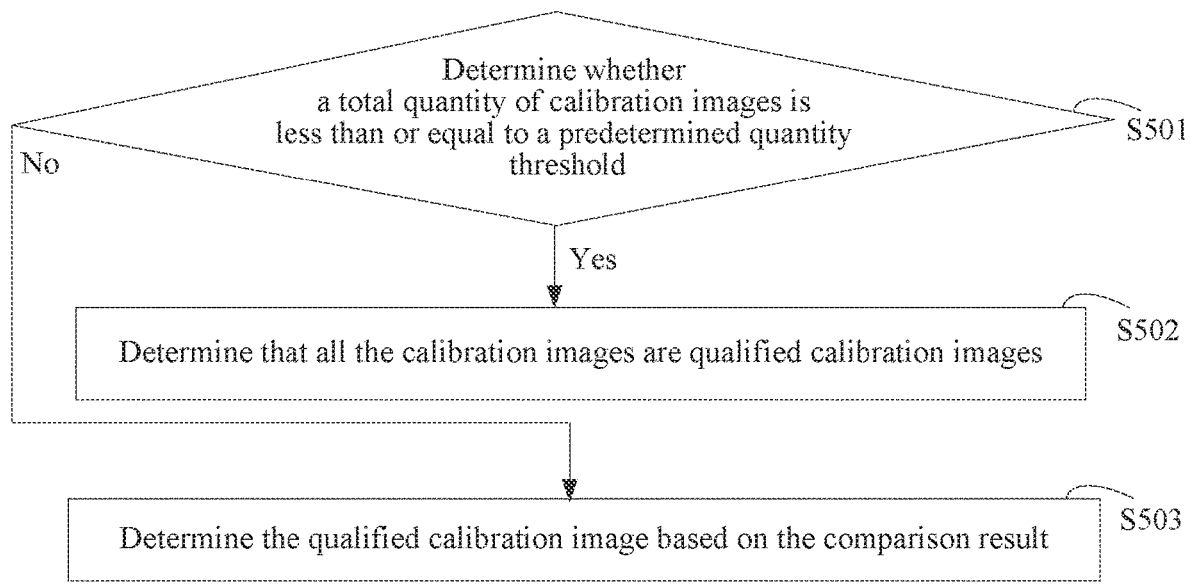
FIG. 6 is a simplified schematic flowchart showing a method for calculating a motion amplitude of an object in medical scanning according to an embodiment.

In certain embodiments, FIG. 6, shows a method for calculating a motion amplitude of an object in medical scanning according to an embodiment of this application, before the qualified calibration image is determined based on the comparison result, the method includes the following steps:

S501: Determine whether a total quantity of calibration images is less than a predetermined quantity threshold. If the total quantity of calibration images is less than the predetermined quantity threshold, step S502 is performed; or, if the quantity of calibration images is not less than the predetermined quantity threshold, step S503 is performed.

In some examples, before comparing the deviation between the first calibration point and the second calibration point of each calibration image and the deviation threshold in step S302, the computer device is configured to compare a total quantity of calibration images with a predetermined quantity threshold. If the total quantity of calibration images is less than or equal to the predetermined quantity threshold, the computer device is configured to determines that all remaining calibration images are qualified calibration images; or, if the total quantity of calibration images is greater than the predetermined quantity threshold, the computer device is configured to determine the qualified calibration image based on the comparison result obtained by comparing the deviation between the first calibration point and the second calibration point of each calibration image and the deviation threshold.

S502: Determine that all the calibration images are qualified calibration images.

In certain examples, if it is determined that the total quantity of calibration images is less than the predetermined quantity threshold, the computer device is configured to determine that all the calibration images are qualified calibration images. In some examples, when the total quantity of calibration images is equal to the predetermined quantity threshold, the computer device is configured to determine that all the calibration images are qualified calibration images.

S503: Determine the qualified calibration image based on the comparison result.

In various examples, if the computer device determines that the quantity of calibration images is greater than the predetermined quantity threshold, the computer device is configured to determine the qualified calibration image based on the comparison result obtained by comparing the deviation between the first calibration point and the second calibration point of each calibration image and the deviation threshold.

In various examples, a method, such as performed by the computer device, for determining the qualified calibration image includes: calculating a deviation Err of each calibration image of a plurality of starting calibration images N1, comparing the deviation Err of each calibration image with the deviation threshold e, and determining that each calibration image of a quantity of n calibration images has a corresponding Err greater than e and is thus determined as an unqualified calibration images. Therefore, the quantity of current qualified calibration images is $N_1-n$.

In some examples, if n=0 (all of the plurality of starting calibration images $N_1$ are included in the current qualified calibration images), the computer device has not screened out any calibration image as unqualified calibration image. For example, the computer device is configured to select a quantity of qualified calibration images equivalent to the predetermined quantity threshold N, where the selected quantity of qualified calibration images is the quantity $N_2$ of the selected current calibration images, that is, $N_2=N$.

In some examples, if $n \neq 0$, the computer device is configured to screen out one or more unqualified calibration images n, and the remaining calibration images are kept as current qualified calibration images, and to determine whether the quantity of the current qualified calibration images is less than the predetermined quantity threshold N. If the quantity of the current qualified calibration images is less than the predetermined quantity threshold N, the computer device is configured to screen out the unqualified images in descending order of deviations until the quantity of remaining calibration images is the predetermined quantity threshold N. For example, the quantity of the remaining calibration images is the quantity $N_2$ of the selected current qualified calibration images determined by the computer device.

In certain embodiments, if the quantity of the current qualified calibration images is greater than the predetermined quantity threshold N, the computer device is configured to redetermine the deviation of each of the current qualified calibration images, that is, to redetermines the quantity of the current qualified calibration images by comparing the deviation of each current qualified calibration image with the deviation threshold. In various examples, the method, such as implemented by the computer device, includes redetermining the deviation of each of the current qualified calibration images, redetermining the quantity of the current qualified calibration images, determining whether the quantity of the current qualified calibration images is less than the predetermined quantity threshold, and when the quantity of the current qualified calibration images is less than the predetermined quantity threshold, and determining the quantity $N_2$ of the finally selected qualified calibration images.

In various embodiments, a method for calculating a motion amplitude of an object in medical scanning includes, before determining the qualified calibration image based on the comparison result, comparing (e.g., using the computer device) the total quantity of the calibration images with the predetermined quantity threshold, and when the total quantity is less than or equal to the predetermined quantity threshold, determining that all the remaining calibration images are qualified calibration images. In some examples, when the total quantity of the calibration images is greater than the predetermined quantity threshold, if the quantity of qualified calibration images is less than the predetermined quantity threshold after the computer device determines the quantity of qualified calibration images, the computer device screens out the unqualified images in descending order of deviations until the quantity of remaining calibration images is the predetermined quantity threshold, and determines that the calibration images whose quantity is within the predetermined quantity threshold are the qualified calibration images. In some examples, this method helps avoid a scenario in which all the calibration images are unqualified calibration images. In some examples, when the total quantity of calibration images is greater than the predetermined quantity threshold, if no unqualified calibration image are screened out and the quantity of qualified calibration images is greater than the predetermined threshold after the computer device determines the quantity of qualified calibration images, the computer device sorts the qualified calibration images in order of deviations, and screens out the calibration image with a large deviation so that the quantity of qualified calibration images reaches the predetermined quantity threshold. In some examples, this method helps avoid a large amount of computing time consumption caused by having too many qualified calibration images.

In various embodiments, calculating the motion amplitude of the object includes calculating the motion amplitude of an object on a two-dimensional plane or calculating the motion amplitude of an object in a three-dimensional space. In various examples, the method for calculating a motion amplitude includes creating a datum plane library (e.g., a reference plane library), such as before calibrating the imaging device, such as to facilitate calculation of the motion amplitude of the object in a plurality of planes of the object (e.g., in the three-dimensional space). According to certain embodiments, a method for calculating a motion amplitude of an object in medical scanning according to an embodiment includes: creating a datum plane library, where the datum plane library includes at least one calibrated to-be-measured plane. In some examples, calibrating the to-be-measured plane includes, such as using the imaging device, acquiring an image of any plane on which a calibration plate is placed. In certain examples, calculating the motion amplitude of the object in medical scanning includes creating a datum plane library that includes at least one to-be-measured plane. In some examples, a to-be-measured plane is plane within a two-dimensional plane and/or a plane in a three-dimensional space.

Figure 7:
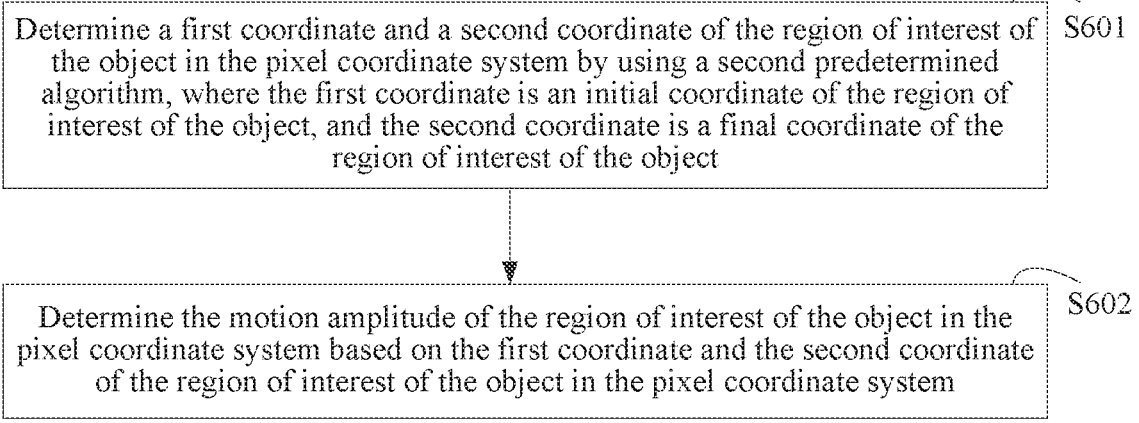
FIG. 7 is a simplified schematic flowchart showing a method for calculating a motion amplitude of an object in medical scanning according to an embodiment.

In various embodiments, calculation of the motion amplitude of the object in the pixel coordinate system is performed prior to calculation of the motion amplitude of the object in the world coordinate system. In some examples, the motion amplitude of the object in the world coordinate system is determined based on the motion amplitude of the object in the pixel coordinate system and the mapping relationship between the pixel coordinate system and the world coordinate system. In an embodiment, as shown in FIG. 7, a method for calculating a motion amplitude of an object in medical scanning includes the following steps:

S601: Determine a first coordinate and a second coordinate of the region of interest of the object in the pixel coordinate system by using a second predetermined algorithm, where the first coordinate is an initial coordinate of the region of interest of the object, and the second coordinate is a final coordinate of the region of interest of the object.

In some embodiments, the second predetermined algorithm is a feature point extraction algorithm or an edge detection algorithm. In some examples, the first coordinate of the region of interest of the object in the pixel coordinate system is an initial coordinate of an initial location of the region of interest of the object, and the second coordinate is a coordinate of a final location of the region of interest of the object in the pixel coordinate system. In various examples, the computer device is configured to determine a point of interest in the region of interest of the object based on the second predetermined algorithm, and to determine the first coordinate and the second coordinate of the point of interest.

S602: Determine the motion amplitude of the region of interest of the object in the pixel coordinate system based on the first coordinate and the second coordinate of the region of interest of the object in the pixel coordinate system.

In some embodiments, based on the first coordinate and the second coordinate of the region of interest of the object in the pixel coordinate system, where the first coordinate and the second coordinate are determined (e.g., by the computer device) in step S601, calculation (e.g., by the computer device) of a distance between the first coordinate and the second coordinate of the region of interest of the object, the distance is the motion amplitude of the region of interest of the object in the pixel coordinate system. In certain examples, the distance between the first coordinate and the second coordinate of the region of interest of the object is an average of distances between a first coordinate and a second coordinate of each point of interest of the object in the region of interest.

In various examples, calculating (e.g., by the computer device) a motion amplitude of an object in medical scanning, includes determining the motion amplitude of the region of interest of the object in the pixel coordinate system based on the first coordinate and the second coordinate of the region of interest of the object in the pixel coordinate system. In various examples, by using the motion amplitude of the region of interest of the object in the pixel coordinate system, the computer device is configured to more quickly and more accurately calculate the motion amplitude of the region of interest of the object in the world coordinate system.

It should be understood that although the steps in the flowcharts of FIG. 2 to FIG. 7 are sequentially displayed as indicated by arrows, the steps are not necessarily performed in the order indicated by the arrows. The order of performing the steps is not strictly limited, and the steps may be performed in other order. Moreover, at least some of the steps in FIG. 2 to FIG. 7 may include a plurality of sub-steps or a plurality of stages. The sub-steps or stages are not necessarily performed at the same time but may be performed at different times. The sub-steps or stages are not necessarily sequentially performed but may be performed together with other steps or with at least some sub-steps or stages of other steps in turn or alternately.

FIGS. 8-13 are simplified diagrams showing one or more systems for calculating a motion amplitude of an object in medical scanning, according to some embodiments of the present invention. The diagrams are merely examples, which should not unduly limit the scope of the claims. One of ordinary skill in the art would recognize many variations, alternatives, and modifications. Although the above has been shown using a selected group of components, there can be many alternatives, modifications, and variations. For example, some of the components may be expanded and/or combined. Other components may be inserted to those noted above. Depending upon the embodiment, the arrangement of components may be interchanged with others replaced.

Figure 8:
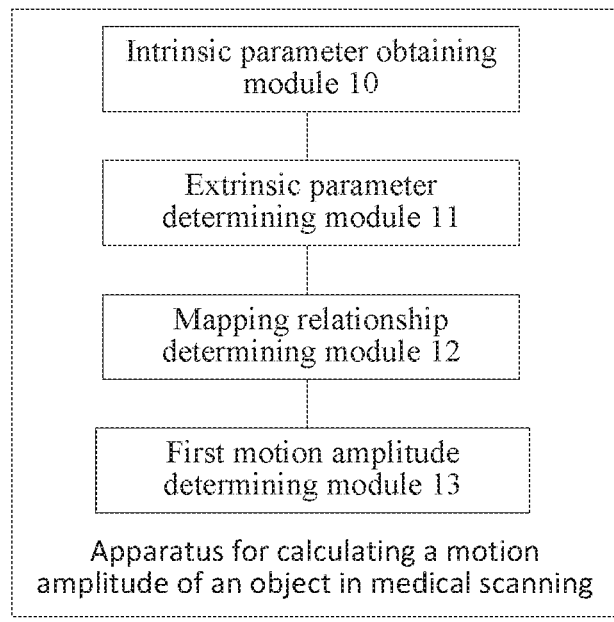
FIG. 8 is a simplified structural block diagram showing an apparatus for calculating a motion amplitude of an object in medical scanning according to an embodiment.

In an embodiment, as shown in FIG. 8, an apparatus for calculating a motion amplitude of an object in medical scanning is provided, includes: an intrinsic parameter obtaining module 10, an extrinsic parameter determining module 11, a mapping relationship determining module 12, and a first motion amplitude determining module 13.

In various examples, the intrinsic parameter obtaining module 10 is configured to calibrate an imaging device based on a first predetermined algorithm and obtain an intrinsic parameter of the imaging device.

In various examples, the extrinsic parameter determining module 11 is configured to determine an extrinsic parameter of the imaging device based on a to-be-measured plane and the intrinsic parameter of the imaging device.

In various examples, the mapping relationship determining module 12 is configured to determine a mapping relationship between a pixel coordinate system and a world coordinate system based on the intrinsic parameter and the extrinsic parameter.

In certain examples, the first motion amplitude determining module 13 is configured to determine a motion amplitude of a region of interest of the object in the world coordinate system based on the mapping relationship and a motion amplitude of the region of interest of the object in the pixel coordinate system.

In some examples, the implementation principles and technical effects of the apparatus for calculating a motion amplitude of an object in medical scanning according to the foregoing embodiment are similar to those of the method embodiments described above.

Figure 9:
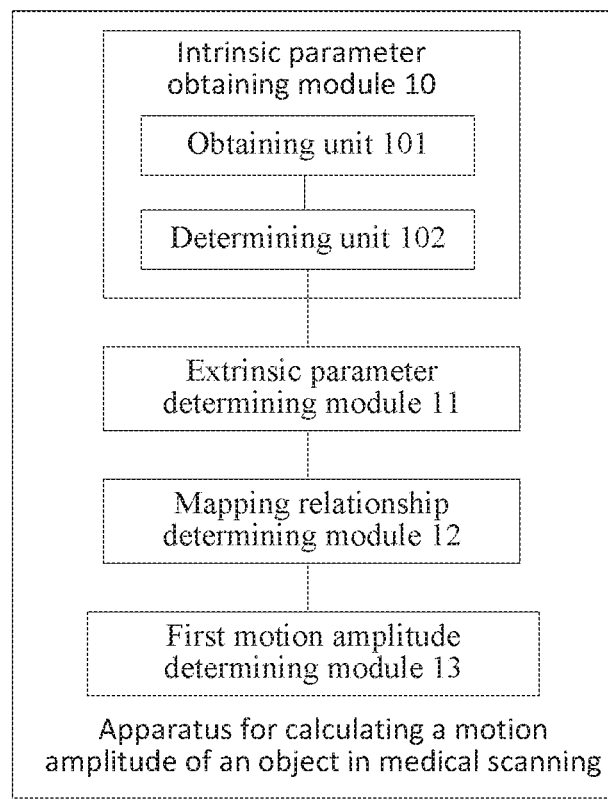
FIG. 9 is a simplified structural block diagram showing an apparatus for calculating a motion amplitude of an object in medical scanning according to an embodiment.

In an embodiment, as shown in FIG. 9, the intrinsic parameter obtaining module 10 includes an obtaining unit 101 and a determining unit 102.

In some examples, the obtaining unit 101 is configured to select a qualified calibration image.

In some examples, the determining unit 102 is configured to determine the intrinsic parameter of the imaging device based on the qualified calibration image.

In certain examples, the implementation principles and technical effects of the apparatus for calculating a motion amplitude of an object in medical scanning according to the foregoing embodiment are similar to those of the method embodiments described above.

Figure 10:
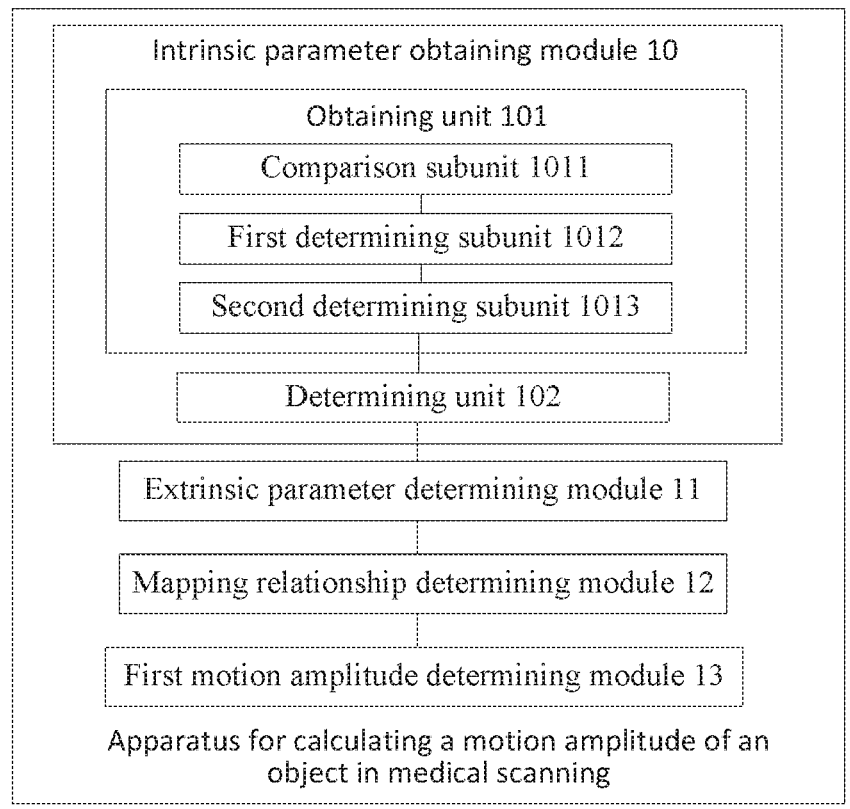
FIG. 10 is a simplified structural block diagram showing an apparatus for calculating a motion amplitude of an object in medical scanning according to an embodiment.

In an embodiment, as shown in FIG. 10, an apparatus for calculating a motion amplitude of an object in medical scanning is provided, and the foregoing obtaining unit 101 includes: a comparison subunit 1011, a first determining subunit 1012, and a second determining subunit 1013.

In some examples, the comparison subunit 1011 is configured to determine whether a quantity of calibration images is less than or equal to a predetermined quantity threshold.

In some examples, the first determining subunit 1012 is configured to determine, if the quantity of calibration images is less than or equal to the predetermined quantity threshold, that a remaining calibration image is a qualified calibration image.

In some examples, the second determining subunit 1013 is configured to determine a qualified calibration image based on a comparison result if the quantity of calibration images is greater than the predetermined quantity threshold.

In some examples, the implementation principles and technical effects of the apparatus for calculating a motion amplitude of an object in medical scanning according to the foregoing embodiment are similar to those of the method embodiments described above.

Figure 11:
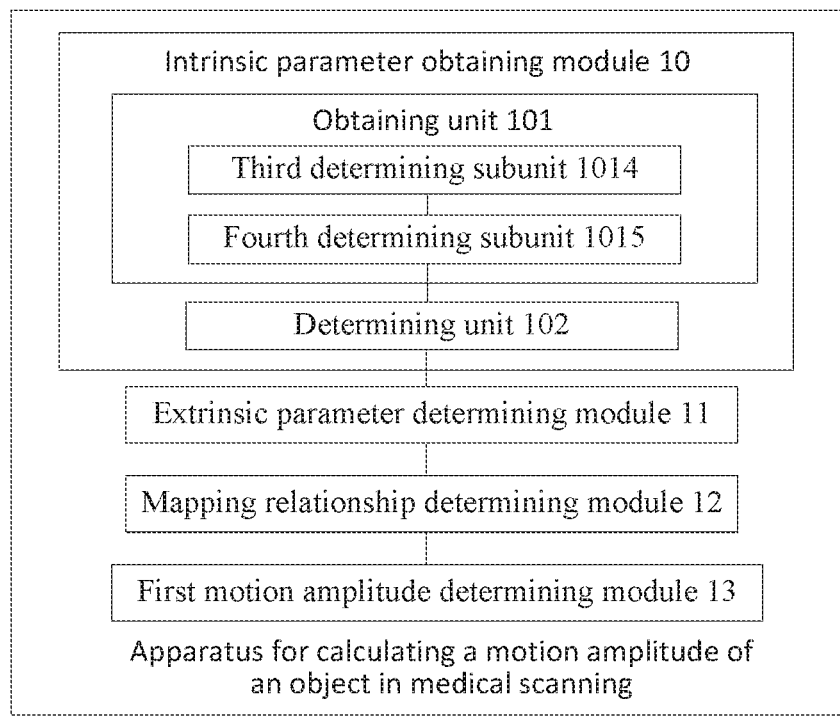
FIG. 11 is a simplified structural block diagram showing an apparatus for calculating a motion amplitude of an object in medical scanning according to an embodiment.

In another embodiment, as shown in FIG. 11, an apparatus for calculating a motion amplitude of an object in medical scanning is provided, and the foregoing obtaining unit 101 further includes: a third determining subunit 1014, and a fourth determining subunit 1015.

In some examples, the third determining subunit 1014 is configured to determine, if the comparison result is that the deviation is less than or equal to the deviation threshold, that the calibration image is a qualified calibration image.

In some examples, the fourth determining subunit 1015 is configured to determine, if the comparison result is that the deviation is greater than the deviation threshold, that the calibration image is an unqualified calibration image.

In some examples, the implementation principles and technical effects of the apparatus for calculating a motion amplitude of an object in medical scanning according to the foregoing embodiment are similar to those of the method embodiments described above.

Figure 12:
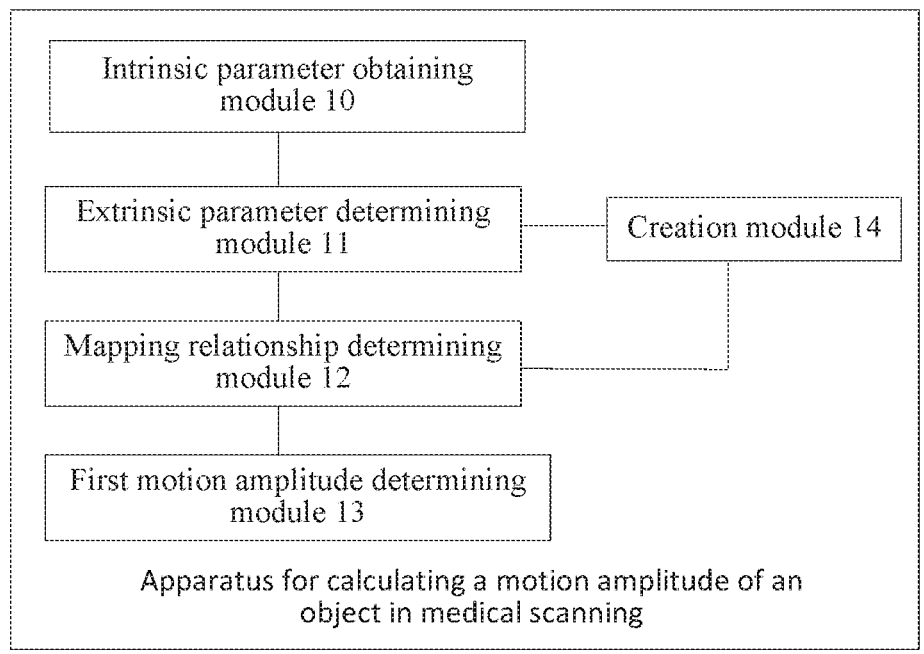
FIG. 12 is a simplified structural block diagram showing an apparatus for calculating a motion amplitude of an object in medical scanning according to an embodiment.

In an embodiment, as shown in FIG. 12, an apparatus for calculating a motion amplitude of an object in medical scanning is provided, and the apparatus includes a creation module 14.

In various examples, the creation module 14 is configured to create a datum plane library, where the datum plane library includes at least one calibrated to-be-measured plane.

In certain examples, the implementation principles and technical effects of the apparatus for calculating a motion amplitude of an object in medical scanning according to the foregoing embodiment are similar to those of the method embodiments described above.

Figure 13:
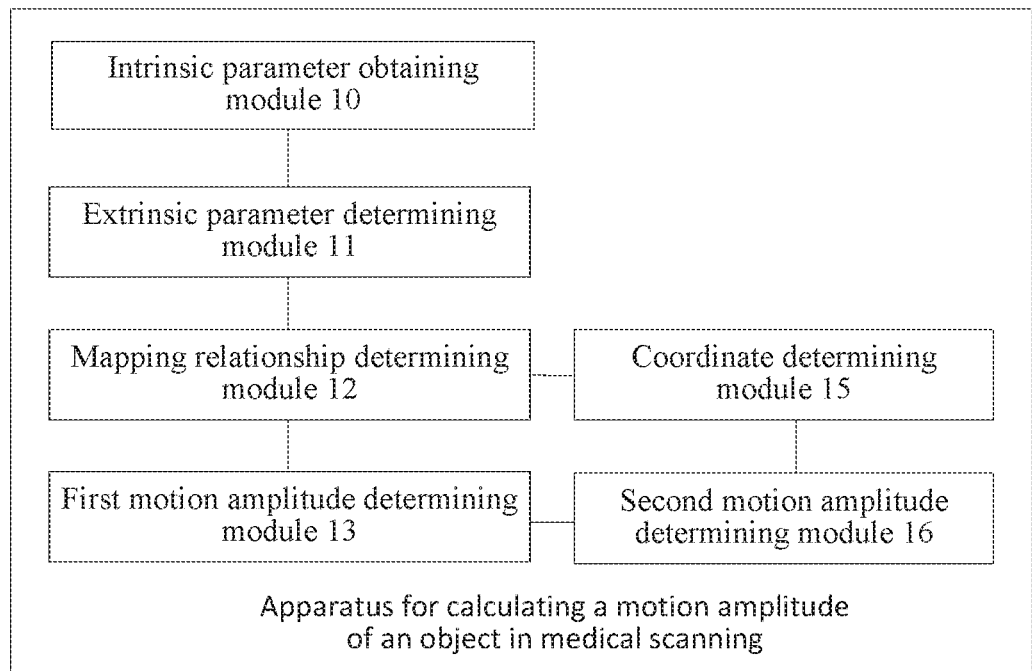
FIG. 13 is a simplified structural block diagram showing an apparatus for calculating a motion amplitude of an object in medical scanning according to an embodiment.

In an embodiment, as shown in FIG. 13, an apparatus for calculating a motion amplitude of an object in medical scanning is provided, and the apparatus includes a coordinate determining module 15 and a second motion amplitude determining module 16.

In some examples, the coordinate determining module 15 is configured to determine a first coordinate and a second coordinate of the region of interest of the object in the pixel coordinate system by using a second predetermined algorithm, where the first coordinate is an initial coordinate of the region of interest of the object, and the second coordinate is a final coordinate of the region of interest of the object.

In some examples, the second motion amplitude determining module 16 is configured to determine the motion amplitude of the region of interest of the object in the pixel coordinate system based on the first coordinate and the second coordinate of the region of interest of the object in the pixel coordinate system.

In certain examples, the implementation principles and technical effects of the apparatus for calculating a motion amplitude of an object in medical scanning according to the foregoing embodiment are similar to those of the method embodiments described above.

For the specific clarification on the apparatus for calculating a motion amplitude of an object in medical scanning, refer to the clarification on the method for calculating a motion amplitude of an object in medical scanning above. All or some of the modules in the apparatus for calculating a motion amplitude of an object in medical scanning may be implemented by software, or hardware, or a combination of software and hardware. Each of the modules may be embedded in or independent of a processor in a computer device in the form of hardware or may be stored in a memory in a computer device in the form of software, so that the processor can invoke each module to perform operations corresponding to the module.

Figure 14:
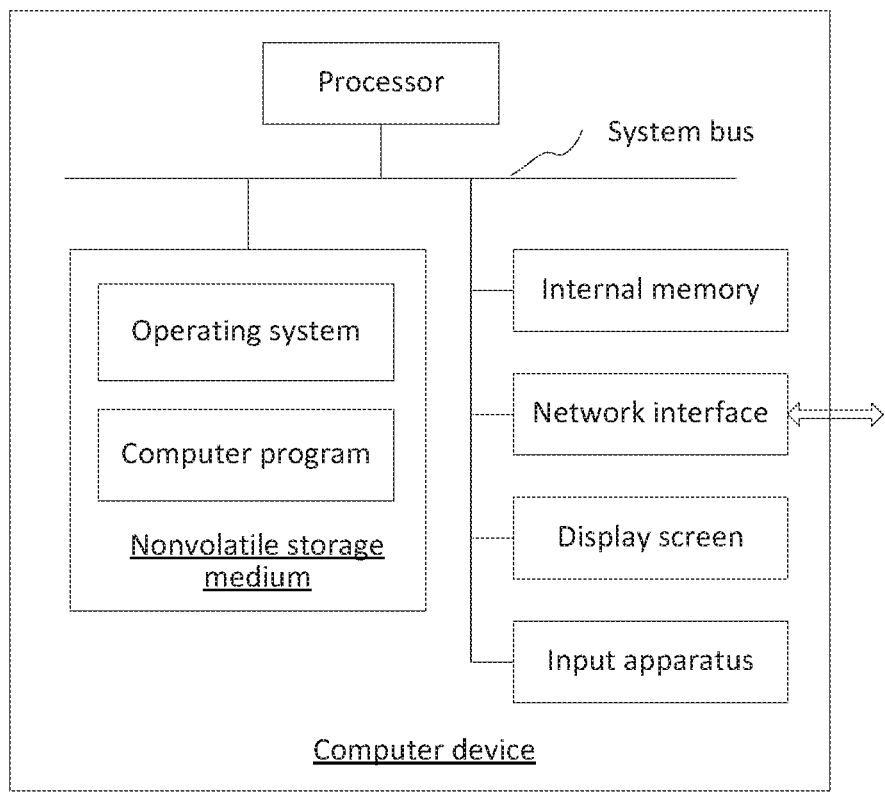
FIG. 14 is a simplified diagram showing an internal structure of a computer device according to an embodiment.

FIG. 14 is a simplified diagram showing an internal structure of a computer device according to an embodiment. This diagram is merely an example, which should not unduly limit the scope of the claims. One of ordinary skill in the art would recognize many variations, alternatives, and modifications. Although the above has been shown using a selected group of components, there can be many alternatives, modifications, and variations. For example, some of the components may be expanded and/or combined. Other components may be inserted to those noted above. Depending upon the embodiment, the arrangement of components may be interchanged with others replaced.

FIG. 14 shows internal structure of a computer device, according to various embodiments. In some examples, the computer device includes a processor, a memory, a network interface, a display screen, and an input device that are connected through a system bus. In certain examples, the processor of the computer device is configured to provide computing and control capabilities. In some examples, the memory of the computer device includes a non-volatile storage medium, and an internal memory. In some examples, the non-volatile storage medium stores an operating system and a computer program. In some examples, the internal memory provides an environment for operation of an operating system and a computer program in the non-volatile storage medium. In certain examples, the network interface of the computer device is configured to communicate with an external terminal through a network connection. In various examples, when executed by the processor, the computer program is configured to implement the method for calculating a motion amplitude of an object in medical scanning. In some examples, the display screen of the computer device is a liquid crystal display or an electronic ink display screen. In some examples, the input device of the computer device is a touch layer coated on the display screen, a button, a trackball, a touchpad disposed on the chassis of the computer device, an external keyboard, a touchpad, and/or a mouse or the like.

A person skilled in the art understands that the structure shown in FIG. 14 is only a block diagram of a part of a structure related to the solution in some embodiments and shall not constitute a limitation on the computer device to which the solution can is applied. The specific computer device may include more or fewer components than those shown, or some of the components may be combined or disposed differently.

In an embodiment, a computer device includes a memory and a processor. For example, the memory is configured to store a computer program that when executed by the processor, the computer program implements the following steps: calibrating a imaging device based on a first predetermined algorithm, and obtaining an intrinsic parameter of the imaging device; determining an extrinsic parameter of the imaging device based on a to-be-measured plane and the intrinsic parameter of the imaging device; determining a mapping relationship between a pixel coordinate system and a world coordinate system based on the intrinsic parameter and the extrinsic parameter; and determining a motion amplitude of a region of interest of the object in the world coordinate system based on the mapping relationship and a motion amplitude of the region of interest of the object in the pixel coordinate system.

In certain examples, the implementation principles and technical effects of the computer device according to the foregoing embodiment are similar to those of the method embodiments described above.

In an embodiment, a computer-readable storage medium, on which a computer program is stored, that when executed by a processor, the computer program implements the following steps: calibrating a imaging device based on a first predetermined algorithm, and obtaining an intrinsic parameter of the imaging device; determining an extrinsic parameter of the imaging device based on a to-be-measured plane and the intrinsic parameter of the imaging device; determining a mapping relationship between a pixel coordinate system and a world coordinate system based on the intrinsic parameter and the extrinsic parameter; and determining a motion amplitude of a region of interest of the object in the world coordinate system based on the mapping relationship and a motion amplitude of the region of interest of the object in the pixel coordinate system.

In certain examples, the implementation principles and technical effects of the computer-readable storage medium according to the foregoing embodiment are similar to those of the method embodiments described above.

A person of ordinary skill in the art may understand that all or some of the processes of the methods in the foregoing embodiments may be implemented by a computer program instructing relevant hardware. The computer program may be stored in a nonvolatile computer-readable storage medium. When executed, the computer program can perform processes that include the foregoing method embodiments. Any reference to a memory, a storage, a database, or other medium used in the embodiments of this application may mean those that include a nonvolatile memory and/or a volatile memory. The nonvolatile memory may include a read-only memory (ROM), a programmable ROM (PROM), an electrically programmable ROM (EPROM), an electrically erasable programmable ROM (EEPROM), or a flash memory. The volatile memory may include a random-access memory (RAM) or an external cache. Illustratively but not restrictively, the RAM may be available in a variety of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink (Synchlink) DRAM (SLDRAM), a rambus (Rambus) direct RAM (RDRAM), a direct rambus dynamic RAM (DRDRAM), and a rambus dynamic RAM (RDRAM).

The foregoing embodiments are merely illustrative of several embodiments of this application. The description thereof is specific and detailed but shall not be construed as a limitation on the scope of the invention patent. It should be noted that various variations and improvements may be made by a person of ordinary skill in the art without departing from the conception of this application, and such variations and improvements shall fall within the protection scope of this application.

Figure 15:
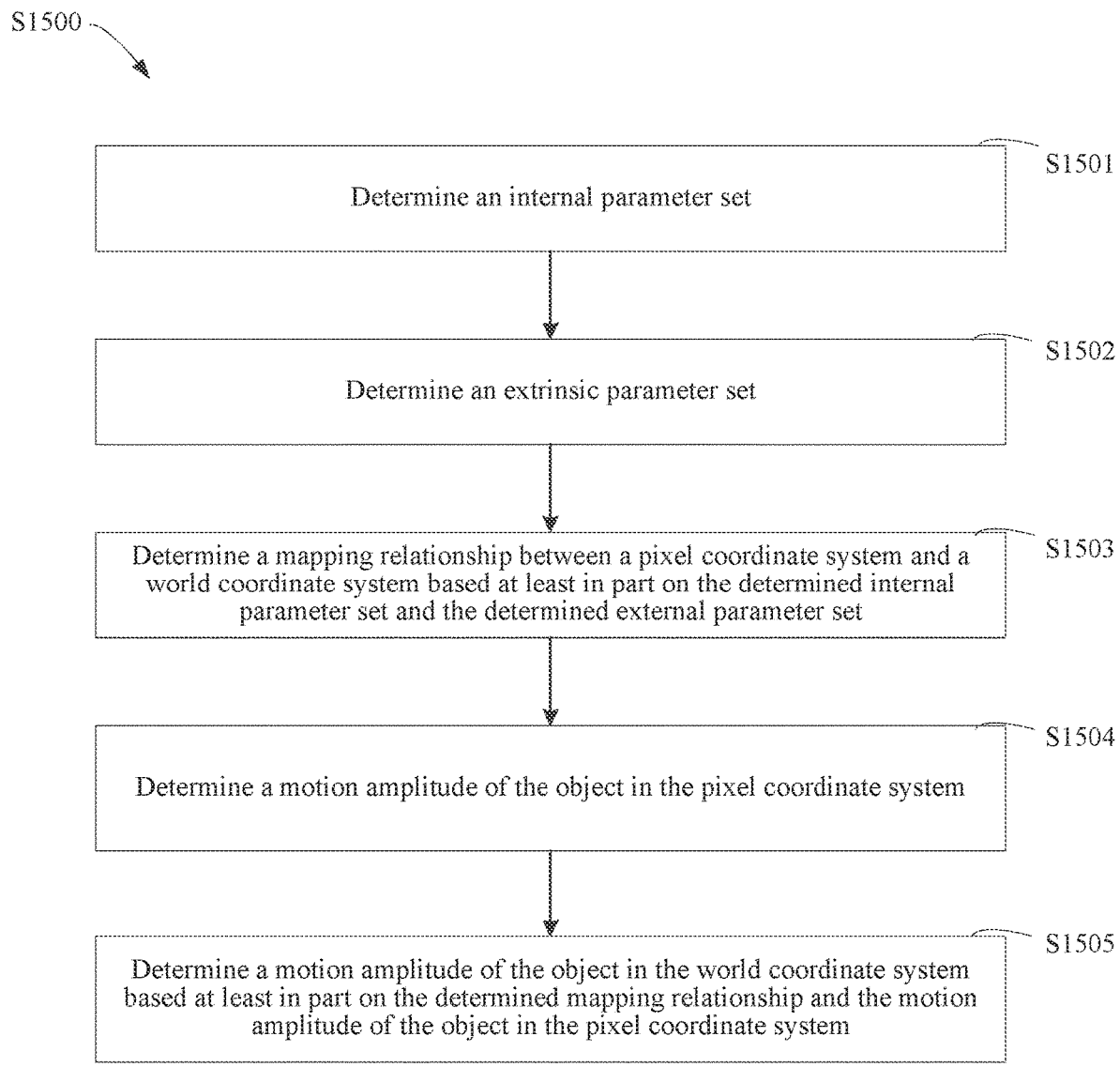
FIG. 15 is a simplified schematic flowchart showing a method for calculating a motion amplitude of an object in medical scanning according to an embodiment.

FIG. 15 is a simplified schematic flowchart showing a method for calculating a motion amplitude of an object in medical scanning according to some embodiments. This diagram is merely an example, which should not unduly limit the scope of the claims. One of ordinary skill in the art would recognize many variations, alternatives, and modifications. In some examples, the method S1500 includes a process S1501 of determining an internal parameter set, a process S1502 of determining an extrinsic parameter set, a process S1503 of determining a mapping relationship between a pixel coordinate system and a world coordinate system based at least in part on the determined internal parameter set and the determined external parameter set, a process S1504 of determining a motion amplitude of the object in the pixel coordinate system, a process S1505 of determining a motion amplitude of the object in the world coordinate system based at least in part on the determined mapping relationship and the motion amplitude of the object in the pixel coordinate system. In some examples, the process S1501 includes the process S101 of FIG. 2, the process S1502 includes the process S102 of FIG. 2, the process S1503 includes the process S103 of FIG. 2, the process S1504 includes the process S602 of FIG. 7, and the process S1505 includes the process S104 of FIG. 2. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

Figure 16:
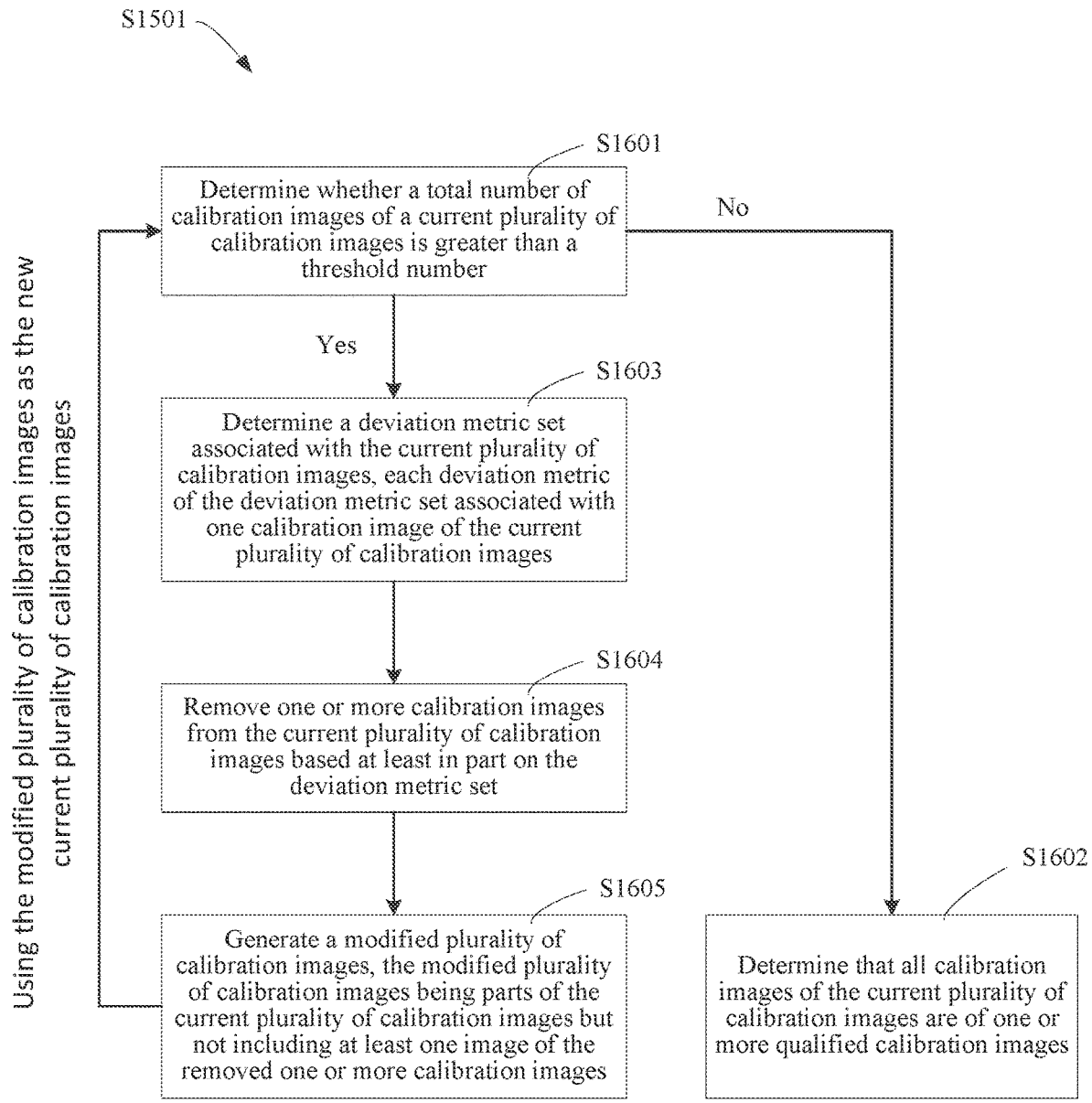
FIG. 16 is a simplified schematic flowchart showing a process for determining an internal parameter set according to an embodiment.

FIG. 16 is a simplified schematic flowchart showing a process for determining an internal parameter set. This diagram is merely an example, which should not unduly limit the scope of the claims. One of ordinary skill in the art would recognize many variations, alternatives, and modifications. In some examples, the process S1501 includes a process S1601 of determining whether a total number of calibration images of a current plurality of calibration images is greater than a threshold number, a process S1602 of, if the total number of calibration images is lesser than or equal to the threshold number, determining that all calibration images of the current plurality of calibration images are of one or more qualified calibration images, a process S1603 of, if the total number of calibration images is greater than the threshold number, determining a deviation metric set associated with the current plurality of calibration images, each deviation metric of the deviation metric set associated with one calibration image of the current plurality of calibration images, a process S1604 of removing one or more calibration images from the current plurality of calibration images based at least in part on the deviation metric set, and a process S1605 of generate a modified plurality of calibration images, the modified plurality of calibration images being parts of the current plurality of calibration images but not including at least one image (e.g., any) of the removed one or more calibration images. In certain embodiments, one or more processes of the process S1501 are repeated, for example, after each modified plurality of calibrated images is generated, using the modified plurality of calibration images as the new current plurality of calibration images, the process S1601 is repeated. In some examples, the process S1601 includes the process S501 of FIG. 6, the process S1602 includes the process S502 of FIG. 6, the process S1603 includes the process S503 of FIG. 6 and/or the processes S301, S302 of FIG. 4, the process S1604 includes the process S303 of FIG. 4 and/or the process S402 of FIG. 5, and the process S1605 includes the process S303 of FIG. 4. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In various embodiments, a computer-implemented method for determining a motion amplitude of an object being scanned using a scanning apparatus includes: determining an internal parameter set based at least in part on calibrating the scanning apparatus according to a first predetermined algorithm; determining an external parameter set based at least in part on a testing surface and the internal parameter set; determining a mapping relationship between a pixel coordinate system and a world coordinate system based at least in part on the determined internal parameter set and the determined external parameter set; determining a motion amplitude of the object in the pixel coordinate system; and determining a motion amplitude of the object in the world coordinate system based at least in part on the determined mapping relationship and the motion amplitude of the object in the pixel coordinate system. In certain examples, determining an internal parameter set based at least in part on calibrating the scanning apparatus according to a first predetermined algorithm includes: determining a first set of values of the internal parameter set associated with a first plurality of calibration images; determining whether a total number of calibration images of the first plurality of calibration images is greater than a threshold number; and if the total number of calibration images is greater than the threshold number: determining a deviation metric set associated with the first plurality of calibration images, each deviation metric of the deviation metric set associated with one calibration image of the first plurality of calibration images; removing one or more calibration images from the first plurality of calibration images based at least in part on the deviation metric set; generating a second plurality of calibration images, the second plurality of calibration images being parts of the first plurality of calibration images but not including at least one image (e.g., any) of the removed one or more calibration images; and determining a second set of values of the internal parameter set associated with the second plurality of calibration images. In some examples, the computer-implemented method is implemented according to one or more methods of FIGS. 2-7 and FIGS. 15-16. In certain examples, the method is implemented by one or more systems of FIGS. 8-14.

In some embodiments, determining a mapping relationship between a pixel coordinate system and a world coordinate system based at least in part on the determined internal parameter set and the determined external parameter set includes using at least the second set of values of the internal parameter set to determine the mapping relationship between the pixel coordinate system and the world coordinate system.

In some embodiments, the first set of values and the second set of values are different.

In some embodiments, determining an internal parameter set based at least in part on calibrating the scanning apparatus according to a first predetermined algorithm includes: selecting one or more qualified calibration images from the first plurality of calibration images; and determining the internal parameter set based at least in part on the selected one or more qualified calibration images. In certain examples, the second plurality of calibration images includes the selected one or more qualified calibration images.

In some embodiments, the selecting one or more qualified calibration images from the first plurality of calibration images includes: for each calibration image of the first plurality of calibration images, determining a deviation between a first calibration point and a second calibration point, the first calibration point of each calibration image corresponds to a coordinate in the pixel coordinate system corresponding to an initial calibration point in the world coordinate system, the second calibration point of each calibration image corresponds to a coordinate obtained from re-mapping the initial calibration point from the world coordinate system onto the pixel coordinate system based on an imaging model, the imaging model being established based at least in part on the first plurality of calibration images, the external parameter set, and the first set of values of the internal parameter set; determining a determination result associated with each calibration image of the first plurality of calibration images based at least in part on comparing the determined deviation associated with each calibration image with a deviation threshold; and selecting the one or more qualified calibration images from the first plurality of calibration images based at least in part on the determination result associated with each calibration image of the first plurality of calibration images.

In some embodiments, selecting the one or more qualified calibration images from the first plurality of calibration images based at least in part on the determination result associated with each calibration image of the first plurality of calibration images includes: if the determination result includes that the determined deviation associated with a first calibration image is less than or equal to the deviation threshold, determining the first calibration image to be a qualified calibration image of the one or more qualified calibration images; and if the determination result includes that the determined deviation associated with the first calibration image is greater than the deviation threshold, determining the one calibration image to be a non-qualified calibration image that is not of the one or more qualified calibration images.

In some embodiments, selecting the one or more qualified calibration images from the first plurality of calibration images based at least in part on the determination result associated with each calibration image of the first plurality of calibration images includes: if the total number of calibration images of the first plurality of calibration images is lesser than or equal to the threshold number, determining that all calibration images of the first plurality of calibration images are of the one or more qualified calibration images; and if the total number of calibration images of the first plurality of calibration images is greater than the threshold number, selecting the one or more qualified calibration images from the first plurality of calibration images based at least in part on the determination result associated with each calibration image of the first plurality of calibration images.

In some embodiments, the computer-implemented method further includes constructing a reference surface library including one or more calibrated surfaces on which the object to be scanned can be placed, each of the one or more calibrated surfaces corresponds to a rotation-translation matrix of the external parameter set.

In some embodiments, determining a motion amplitude of the object in the pixel coordinate system includes: determining a first coordinate and a second coordinate in the pixel coordinate system corresponding to the object according to a second predetermined algorithm, the first coordinate corresponding to an initial coordinate, the second coordinate corresponding to a final coordinate; and determining the motion amplitude of the object in the pixel coordinate system based at least in part on the first coordinate and the second coordinate.

In some embodiments, the external apparatus parameter set includes a rotation-translation matrix; and the internal apparatus parameter set includes one selected from a focal length, a focal point, tilt coefficient, and a distortion coefficient.

In some embodiments, removing one or more calibration images from the first plurality of calibration images includes removing at least one calibration image from the first plurality of calibration images based on a user instruction.

In various embodiments, a system for determining a motion amplitude of an object being scanned using a scanning apparatus includes: an internal parameter determining module configured to determine an internal parameter set based at least in part on calibrating the scanning apparatus according to a first predetermined algorithm; an external parameter determining module configured to determine an external parameter set based at least in part on a testing surface and the internal parameter set; a mapping relationship determining module configured to determine a mapping relationship between a pixel coordinate system and a world coordinate system based at least in part on the determined internal parameter set and the determined external parameter set; a pixel motion module configured to determine a motion amplitude of the object in the pixel coordinate system; and a world motion module configured to determine a motion amplitude of the object in the world coordinate system based at least in part on the determined mapping relationship and the motion amplitude of the object in the pixel coordinate system. In certain examples, the internal parameter determining module is further configured to: determine a first set of values of the internal parameter set based at least in part on a first plurality of calibration images; determine whether a total number of calibration images of the first plurality of calibration images is greater than a threshold number; and if the total number of calibration images is greater than the threshold number: determine a deviation metric set associated with the first plurality of calibration images, each deviation metric of the deviation metric set associated with one calibration image of the first plurality of calibration images; remove one or more calibration images from the first plurality of calibration images based at least in part on the deviation metric set; generate a second plurality of calibration images, the second plurality of calibration images being parts of the first plurality of images but not including at least one image (e.g., any) of the one or more removed calibration images; and determine a second set of values of the internal parameter set associated with the second plurality of calibration images. In some examples, the system is implemented according to one or more systems of FIGS. 8-14 and/or configured to perform one or more methods of FIGS. 2-7 and FIGS. 15-16.

In some embodiments, the mapping relationship determining module is further configured to: use at least the second set of values of the internal parameter set to determine the mapping relationship between the pixel coordinate system and the world coordinate system.

In some embodiments, the first set of values and the second set of values are different.

In some embodiments, the internal parameter determining module is further configured to: select one or more qualified calibration images from the first plurality of calibration images; and determine the internal parameter set based at least in part on the selected one or more qualified calibration images. In certain examples, the second plurality of calibration images includes the selected one or more qualified calibration images.

In some embodiments, the internal parameter determining module is further configured to: for each calibration image of the first plurality of calibration images, determine a deviation between a first calibration point and a second calibration point, the first calibration point of each calibration image corresponds to a coordinate in the pixel coordinate system corresponding to an initial calibration point in the world coordinate system, the second calibration point of each calibration image corresponds to a coordinate obtained from re-mapping the initial calibration point from the world coordinate system onto the pixel coordinate system based on an imaging model, the imaging model being established based at least in part on the first plurality of calibration images, the external parameter set, and the first set of values of the internal parameter set; determine a determination result associated with each calibration image of the first plurality of calibration images based at least in part on comparing the determined deviation associated with each calibration image with a deviation threshold; and select the one or more qualified calibration images from the first plurality of calibration images based at least in part on the determination result associated with each calibration image of the first plurality of calibration images.

In some embodiments, the internal parameter determining module is further configured to: if the determination result includes that the determined deviation associated with a first calibration image is less than or equal to the deviation threshold, determine the first calibration image to be a qualified calibration image of the one or more qualified calibration images; and if the determination result includes that the determined deviation associated with the first calibration image is greater than the deviation threshold, determine the one calibration image to be a non-qualified calibration image that is not of the one or more qualified calibration images.

In various embodiments, a non-transitory computer-readable medium with instructions stored thereon, that when executed by a processor, perform the processes including: determining an internal parameter set based at least in part on calibrating the scanning apparatus according to a first predetermined algorithm; determining an external parameter set based at least in part on a testing surface and the internal parameter set; determining a mapping relationship between a pixel coordinate system and a world coordinate system based at least in part on the determined internal parameter set and the determined external parameter set; determining a motion amplitude of the object in the pixel coordinate system; and determining a motion amplitude of the object in the world coordinate system based at least in part on the determined mapping relationship and the motion amplitude of the object in the pixel coordinate system. In certain examples, the non-transitory computer-readable medium with instructions stored thereon, that when executed by a processor, further perform the processes including: determining a first set of values of the internal parameter set associated with a first plurality of calibration images; determining whether a total number of calibration images of the first plurality of calibration images is greater than a threshold number; and if the total number of calibration images is greater than the threshold number: determining a deviation metric set associated with the first plurality of calibration images, each deviation metric of the deviation metric set associated with one calibration image of the first plurality of calibration images; removing one or more calibration images from the first plurality of calibration images based at least in part on the deviation metric set; generating a second plurality of calibration images, the second plurality of calibration images being parts of the first plurality of calibration images but not including at least one image (e.g., any) of the removed one or more calibration images; and determining a second set of values of the internal parameter set associated with the second plurality of calibration images. In some examples, the non-transitory computer-readable medium with instructions stored thereon is implemented according to at least one or more methods of FIGS. 2-7 and FIGS. 15-16, and/or by one or more systems (e.g., a terminal) of FIGS. 8-14.

In some embodiments, the first set of values and the second set of values are different.

In some embodiments, the non-transitory computer-readable medium, when executed by a processor, further perform the processes including: selecting one or more qualified calibration images from the first plurality of calibration images; and determining the internal parameter set based at least in part on the selected one or more qualified calibration images. In certain examples, the second plurality of calibration images includes the selected one or more qualified calibration images.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code including program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A computer-implemented method for determining a motion amplitude of an object being scanned using a scanning apparatus, the method comprising:
   determining an internal parameter set based at least in part on calibrating the scanning apparatus according to a first predetermined algorithm;
   determining an external parameter set based at least in part on a testing surface and the internal parameter set;
   determining a mapping relationship between a pixel coordinate system and a world coordinate system based at least in part on the determined internal parameter set and the determined external parameter set;
   determining a motion amplitude of the object in the pixel coordinate system; and
   determining a motion amplitude of the object in the world coordinate system based at least in part on the determined mapping relationship and the motion amplitude of the object in the pixel coordinate system;
   wherein the determining an internal parameter set based at least in part on calibrating the scanning apparatus according to a first predetermined algorithm includes:
      determining a first set of values of the internal parameter set associated with a first plurality of calibration images;
      determining whether a total number of calibration images of the first plurality of calibration images is greater than a threshold number; and
      if the total number of calibration images is greater than the threshold number:
         determining a deviation metric set associated with the first plurality of calibration images, each deviation metric of the deviation metric set associated with one calibration image of the first plurality of calibration images;
         removing one or more calibration images from the first plurality of calibration images based at least in part on the deviation metric set;
         generating a second plurality of calibration images, the second plurality of calibration images being parts of the first plurality of calibration images but not including at least one image of the removed one or more calibration images; and
         determining a second set of values of the internal parameter set associated with the second plurality of calibration images.

2. The computer-implemented method of claim 1, wherein:
   the determining a mapping relationship between a pixel coordinate system and a world coordinate system based at least in part on the determined internal parameter set and the determined external parameter set includes:
      using at least the second set of values of the internal parameter set to determine the mapping relationship between the pixel coordinate system and the world coordinate system.

3. The computer-implemented method of claim 1, wherein the first set of values and the second set of values are different.

4. The computer-implemented method of claim 1, wherein the determining an internal parameter set based at least in part on calibrating the scanning apparatus according to a first predetermined algorithm includes:
   selecting one or more qualified calibration images from the first plurality of calibration images; and
   determining the internal parameter set based at least in part on the selected one or more qualified calibration images;
   wherein the second plurality of calibration images includes the selected one or more qualified calibration images.

5. The computer-implemented method of claim 4, wherein the selecting one or more qualified calibration images from the first plurality of calibration images includes:
   for each calibration image of the first plurality of calibration images, determining a deviation between a first calibration point and a second calibration point, the first calibration point of each calibration image corresponds to a coordinate in the pixel coordinate system corresponding to an initial calibration point in the world coordinate system, the second calibration point of each calibration image corresponds to a coordinate obtained from re-mapping the initial calibration point from the world coordinate system onto the pixel coordinate system based on an imaging model, the imaging model being established based at least in part on the first plurality of calibration images, the external parameter set, and the first set of values of the internal parameter set;
   determining a determination result associated with each calibration image of the first plurality of calibration images based at least in part on comparing the determined deviation associated with each calibration image with a deviation threshold; and
   selecting the one or more qualified calibration images from the first plurality of calibration images based at least in part on the determination result associated with each calibration image of the first plurality of calibration images.

6. The computer-implemented method of claim 5, wherein the selecting the one or more qualified calibration images from the first plurality of calibration images based at least in part on the determination result associated with each calibration image of the first plurality of calibration images includes:
- if the determination result includes that the determined deviation associated with a first calibration image is less than or equal to the deviation threshold, determining the first calibration image to be a qualified calibration image of the one or more qualified calibration images; and
- if the determination result includes that the determined deviation associated with the first calibration image is greater than the deviation threshold, determining the one calibration image to be a non-qualified calibration image that is not of the one or more qualified calibration images.

7. The computer-implemented method of claim 5, wherein the selecting the one or more qualified calibration images from the first plurality of calibration images based at least in part on the determination result associated with each calibration image of the first plurality of calibration images includes:
- if the total number of calibration images of the first plurality of calibration images is lesser than or equal to the threshold number, determining that all calibration images of the first plurality of calibration images are of the one or more qualified calibration images; and
- if the total number of calibration images of the first plurality of calibration images is greater than the threshold number, selecting the one or more qualified calibration images from the first plurality of calibration images based at least in part on the determination result associated with each calibration image of the first plurality of calibration images.

8. The computer-implemented method of claim 1, further comprising:
- constructing a reference surface library including one or more calibrated surfaces on which the object to be scanned can be placed, each of the one or more calibrated surfaces corresponds to a rotation-translation matrix of the external parameter set.

9. The computer-implemented method of claim 1, wherein the determining a motion amplitude of the object in the pixel coordinate system includes:
- determining a first coordinate and a second coordinate in the pixel coordinate system corresponding to the object according to a second predetermined algorithm, the first coordinate corresponding to an initial coordinate, the second coordinate corresponding to a final coordinate; and
- determining the motion amplitude of the object in the pixel coordinate system based at least in part on the first coordinate and the second coordinate.

10. The computer-implemented method of claim 1, wherein:
- the external apparatus parameter set includes a rotation-translation matrix; and
- the internal apparatus parameter set includes one selected from a focal length, a focal point, tilt coefficient, and a distortion coefficient.

11. The computer-implemented method of claim 1, wherein the removing one or more calibration images from the first plurality of calibration images includes:
- removing at least one calibration image from the first plurality of calibration images based on a user instruction.

12. A system for determining a motion amplitude of an object being scanned using a scanning apparatus, the system comprising:
- an internal parameter determining module configured to determine an internal parameter set based at least in part on calibrating the scanning apparatus according to a first predetermined algorithm;
- an external parameter determining module configured to determine an external parameter set based at least in part on a testing surface and the internal parameter set;
- a mapping relationship determining module configured to determine a mapping relationship between a pixel coordinate system and a world coordinate system based at least in part on the determined internal parameter set and the determined external parameter set;
- a pixel motion module configured to determine a motion amplitude of the object in the pixel coordinate system; and
- a world motion module configured to determine a motion amplitude of the object in the world coordinate system based at least in part on the determined mapping relationship and the motion amplitude of the object in the pixel coordinate system;
- wherein the internal parameter determining module is further configured to:
  - determine a first set of values of the internal parameter set based at least in part on a first plurality of calibration images;
  - determine whether a total number of calibration images of the first plurality of calibration images is greater than a threshold number; and
  - if the total number of calibration images is greater than the threshold number:
    - determine a deviation metric set associated with the first plurality of calibration images, each deviation metric of the deviation metric set associated with one calibration image of the first plurality of calibration images;
    - remove one or more calibration images from the first plurality of calibration images based at least in part on the deviation metric set;
    - generate a second plurality of calibration images, the second plurality of calibration images being parts of the first plurality of images but not including at least one image of the one or more removed calibration images; and
    - determine a second set of values of the internal parameter set associated with the second plurality of calibration images.

13. The system of claim 12, wherein the mapping relationship determining module is further configured to:
- use at least the second set of values of the internal parameter set to determine the mapping relationship between the pixel coordinate system and the world coordinate system.

14. The system of claim 12, wherein the first set of values and the second set of values are different.

15. The system of claim 12, wherein the internal parameter determining module is further configured to:
- select one or more qualified calibration images from the first plurality of calibration images; and
- determine the internal parameter set based at least in part on the selected one or more qualified calibration images;
- wherein the second plurality of calibration images includes the selected one or more qualified calibration images.

16. The system of claim 15, wherein the internal parameter determining module is further configured to:
- for each calibration image of the first plurality of calibration images, determine a deviation between a first calibration point and a second calibration point, the first calibration point of each calibration image corresponds to a coordinate in the pixel coordinate system corresponding to an initial calibration point in the world coordinate system, the second calibration point of each calibration image corresponds to a coordinate obtained from re-mapping the initial calibration point from the world coordinate system onto the pixel coordinate system based on an imaging model, the imaging model being established based at least in part on the first plurality of calibration images, the external parameter set, and the first set of values of the internal parameter set;
- determine a determination result associated with each calibration image of the first plurality of calibration images based at least in part on comparing the determined deviation associated with each calibration image with a deviation threshold; and
- select the one or more qualified calibration images from the first plurality of calibration images based at least in part on the determination result associated with each calibration image of the first plurality of calibration images.

17. The system of claim 16, wherein the internal parameter determining module is further configured to:
- if the determination result includes that the determined deviation associated with a first calibration image is less than or equal to the deviation threshold, determine the first calibration image to be a qualified calibration image of the one or more qualified calibration images; and
- if the determination result includes that the determined deviation associated with the first calibration image is greater than the deviation threshold, determine the one calibration image to be a non-qualified calibration image that is not of the one or more qualified calibration images.

18. A non-transitory computer-readable medium with instructions stored thereon, that when executed by a processor, perform the processes comprising:
- determining an internal parameter set based at least in part on calibrating the scanning apparatus according to a first predetermined algorithm;
- determining an external parameter set based at least in part on a testing surface and the internal parameter set;
- determining a mapping relationship between a pixel coordinate system and a world coordinate system based at least in part on the determined internal parameter set and the determined external parameter set;
- determining a motion amplitude of the object in the pixel coordinate system; and
- determining a motion amplitude of the object in the world coordinate system based at least in part on the determined mapping relationship and the motion amplitude of the object in the pixel coordinate system;
- wherein the determining an internal parameter set based at least in part on calibrating the scanning apparatus according to a first predetermined algorithm includes:
  - determining a first set of values of the internal parameter set associated with a first plurality of calibration images;
  - determining whether a total number of calibration images of the first plurality of calibration images is greater than a threshold number; and
  - if the total number of calibration images is greater than the threshold number:
    - determining a deviation metric set associated with the first plurality of calibration images, each deviation metric of the deviation metric set associated with one calibration image of the first plurality of calibration images;
    - removing one or more calibration images from the first plurality of calibration images based at least in part on the deviation metric set;
    - generating a second plurality of calibration images, the second plurality of calibration images being parts of the first plurality of calibration images but not including at least one image of the removed one or more calibration images; and
    - determining a second set of values of the internal parameter set associated with the second plurality of calibration images.

19. The non-transitory computer-readable medium of claim 18, wherein the first set of values and the second set of values are different.

20. The non-transitory computer-readable medium of claim 18, wherein when executed by a processor, further perform the processes comprising:
- selecting one or more qualified calibration images from the first plurality of calibration images; and
- determining the internal parameter set based at least in part on the selected one or more qualified calibration images;
- wherein the second plurality of calibration images includes the selected one or more qualified calibration images.

* * * * *